United States Patent
Kondo

(10) Patent No.: US 11,932,013 B2
(45) Date of Patent: Mar. 19, 2024

(54) PRINTING DEVICE INCLUDING CARRIAGE HAVING DISTANCE SENSOR FOR MEASURING DISTANCE BETWEEN HEAD AND PRINTING MEDIUM

(71) Applicant: BROTHER KOGYO KABUSHIKI KAISHA, Nagoya (JP)

(72) Inventor: Hirofumi Kondo, Mie (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/680,685

(22) Filed: Feb. 25, 2022

(65) Prior Publication Data

US 2022/0281220 A1   Sep. 8, 2022

(30) Foreign Application Priority Data

Mar. 3, 2021 (JP) ................. 2021-033594

(51) Int. Cl.
*B41J 2/045* (2006.01)
*G01S 17/08* (2006.01)

(52) U.S. Cl.
CPC ........... *B41J 2/04556* (2013.01); *G01S 17/08* (2013.01); *B41J 2203/01* (2020.08)

(58) Field of Classification Search
CPC ............... B41J 2/04556; B41J 11/0095; B41J 2203/01; B41J 2203/011
See application file for complete search history.

(56) References Cited

U.S. PATENT DOCUMENTS

| | | | |
|---|---|---|---|
| 2007/0047157 A1* | 3/2007 | Miyahara | B41J 29/393 360/324.11 |
| 2010/0039473 A1* | 2/2010 | Terada | B41J 11/0095 347/19 |
| 2014/0210886 A1* | 7/2014 | Driggers | B41J 11/0095 347/19 |
| 2015/0124017 A1* | 5/2015 | Aoyama | B41J 11/00214 347/16 |
| 2020/0249889 A1 | 8/2020 | Igarashi | |
| 2020/0276835 A1 | 9/2020 | Kasamatsu et al. | |

FOREIGN PATENT DOCUMENTS

| | | | |
|---|---|---|---|
| JP | 2016153177 A | * | 8/2016 |
| JP | 2020-121533 A | | 8/2020 |
| JP | 2020-138491 A | | 9/2020 |

OTHER PUBLICATIONS

Katano, MachineTranslationofJP-2016153177-A, 2016 (Year: 2016).*

* cited by examiner

*Primary Examiner* — Scott A Richmond
(74) *Attorney, Agent, or Firm* — Merchant & Gould P.C.

(57) ABSTRACT

A printing device includes a head and a carriage. The head has a nozzle. The head is configured to eject liquid from the nozzle toward a printing medium. The carriage is configured to move the head in a first direction. The carriage includes a first distance sensor. The first distance sensor is configured to measure a distance between the head and the printing medium. The first distance sensor is a specular reflection type distance sensor. The first distance sensor includes a light-emitting element and a light-receiving element. The light-emitting element and the light-receiving element are aligned in the first direction.

18 Claims, 18 Drawing Sheets

FIG. 2
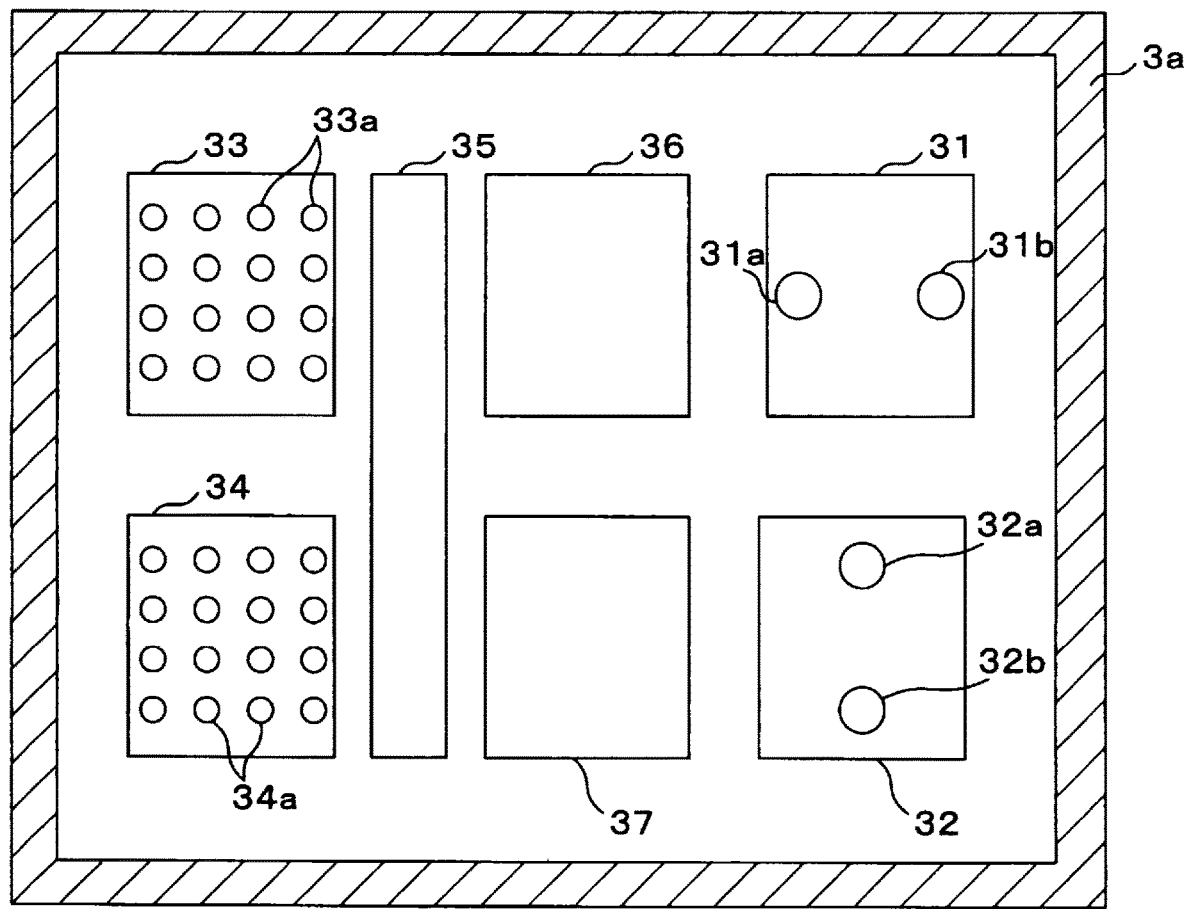
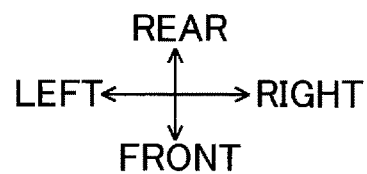

FIG. 4
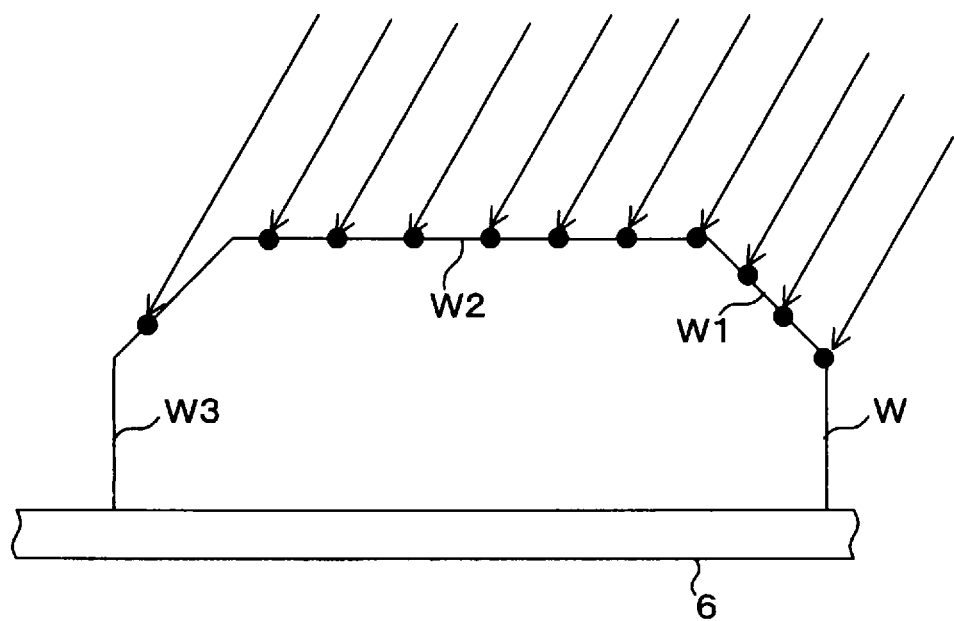
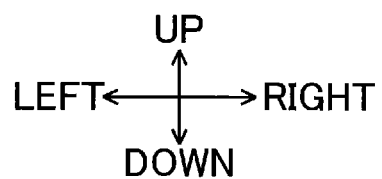

FIG. 6
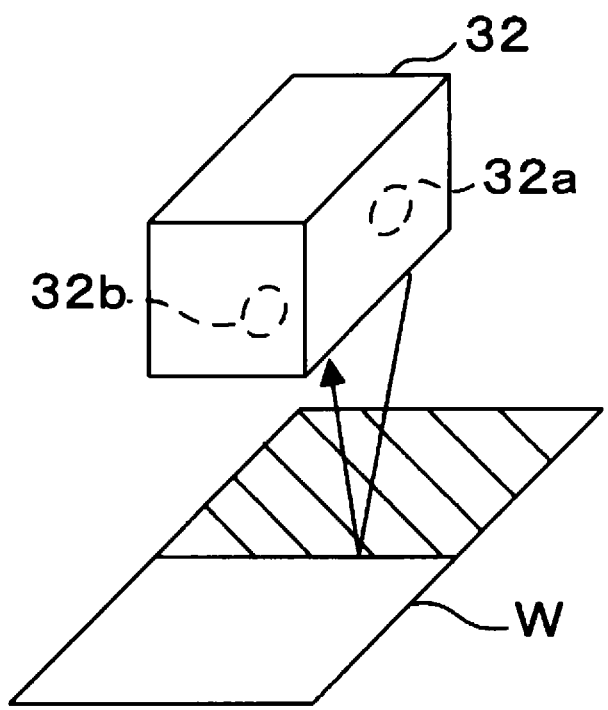
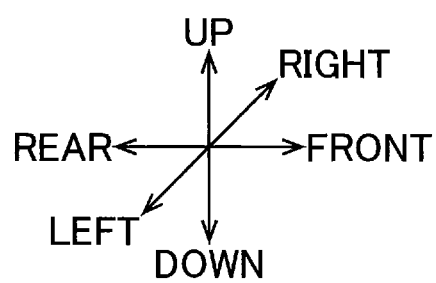

FIG. 7
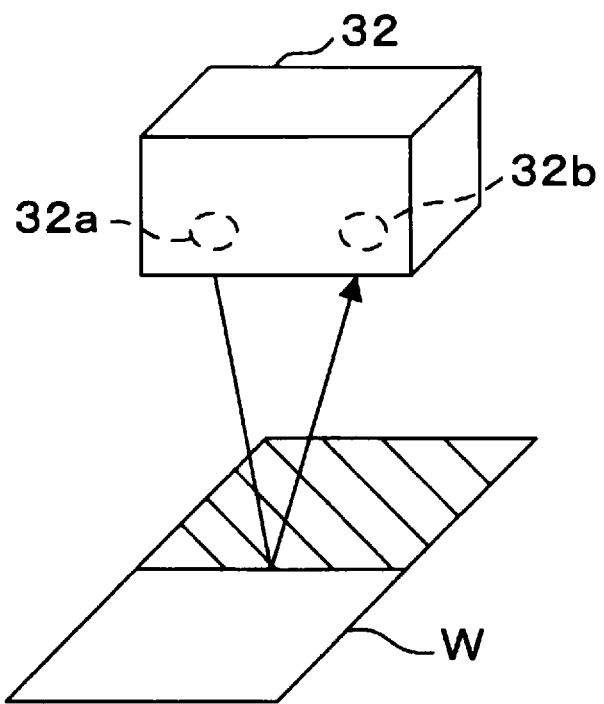
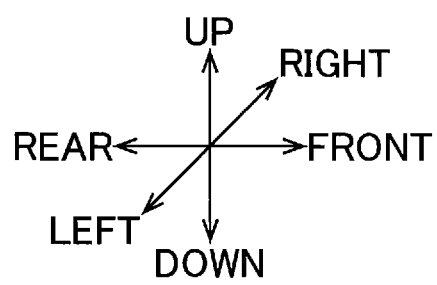

FIG. 11
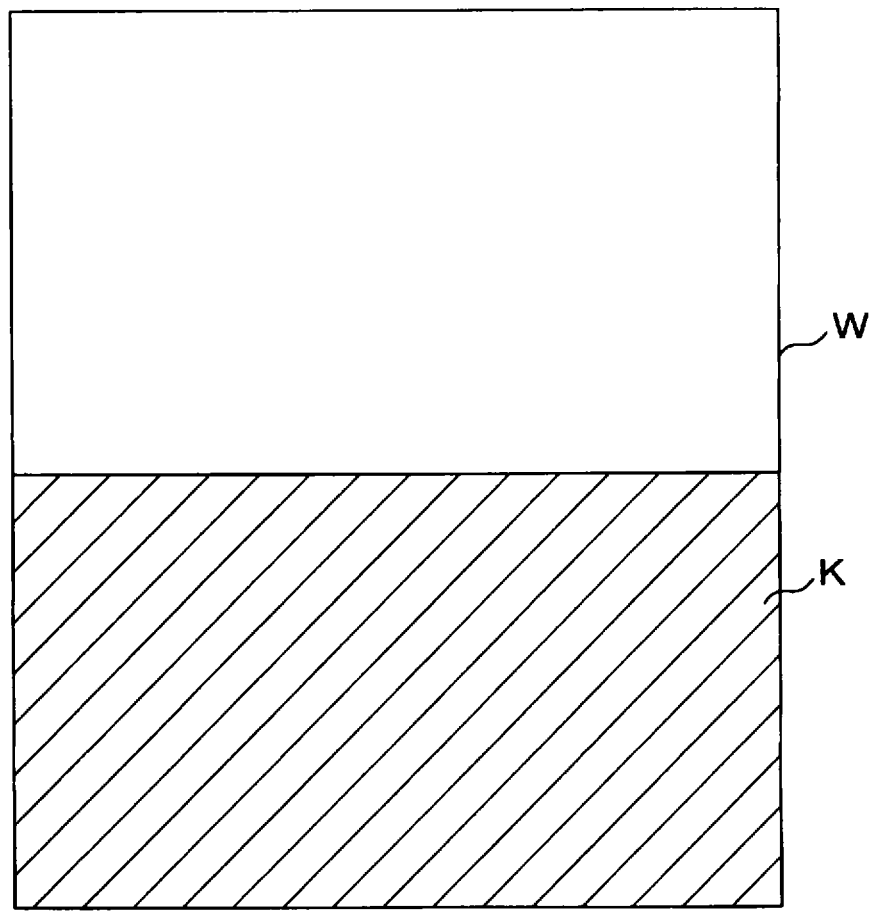
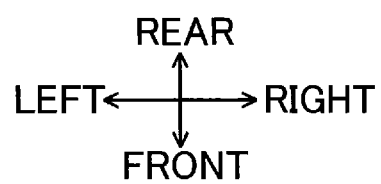

FIG. 14
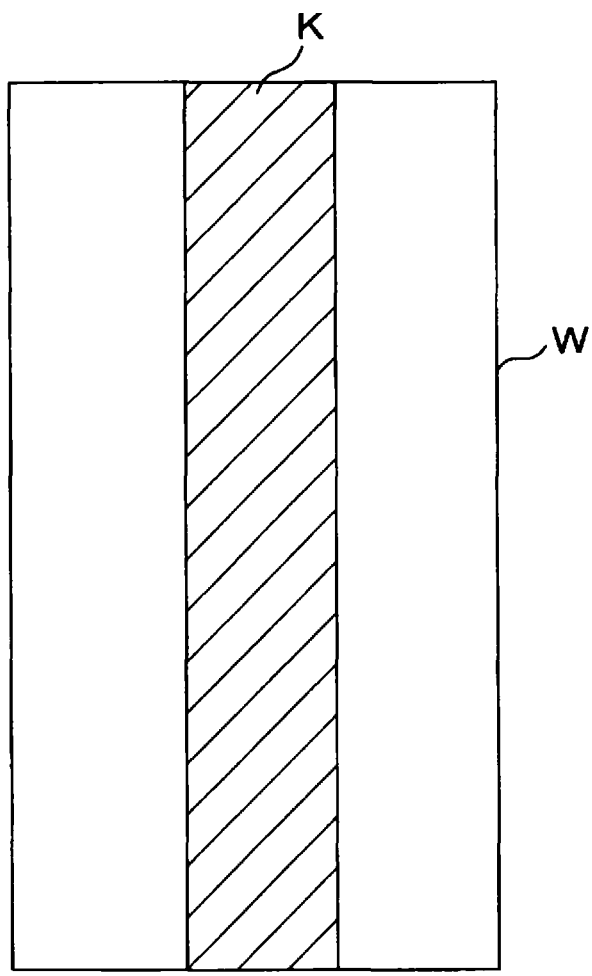
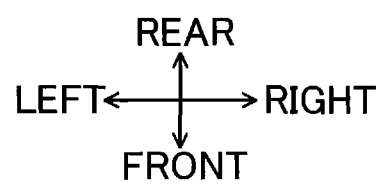

PRINTING DEVICE INCLUDING CARRIAGE HAVING DISTANCE SENSOR FOR MEASURING DISTANCE BETWEEN HEAD AND PRINTING MEDIUM

CROSS REFERENCE TO RELATED APPLICATIONS

This application claims priority from Japanese Patent Application No. 2021-033594 filed Mar. 3, 2021. The entire content of the priority application is incorporated herein by reference.

BACKGROUND

A recording device that has been proposed is provided with a head for ejecting ink, an optical sensor, and a carriage for supporting the optical sensor and head. The optical sensor has a specular reflection type distance sensor for measuring the distance to a recording medium. Based on the distance measured by the optical sensor, the recording device can acquire the thickness of the recording medium to identify the type of the medium.

SUMMARY

The distance sensor has a light-emitting unit and a light-receiving unit. The recording medium is conveyed in a direction orthogonal to the moving direction of the carriage. The light-emitting unit and light-receiving unit of the distance sensor are juxtaposed along the conveying direction of the recording medium. The recording medium may have an uneven surface, and the condition of this unevenness can vary along the moving direction of the carriage. When the optical sensor measures the distance to the recording medium in such cases, light may be reflected off the recording medium at a position offset from the target position.

In view of the foregoing, it is an object of the present disclosure to provide a printing device capable of reflecting light emitted from a specular reflection type distance sensor off a target position on a printing medium, even when the surface of the printing medium is uneven.

In order to attain the above and other object, according to one aspect, the present disclosure provides a printing device including a head and a carriage. The head has a nozzle and is configured to eject liquid from the nozzle toward a printing medium. The carriage is configured to move the head in a first direction. The carriage includes a first distance sensor configured to measure a distance between the head and the printing medium. The first distance sensor is a specular reflection type distance sensor. The first distance sensor includes a light-emitting element and a light-receiving element. The light-emitting element and the light-receiving element are aligned in the first direction.

In the above printing device, the light-emitting element and light-receiving element of the first distance sensor are aligned in the first direction, i.e., the moving direction of the carriage. Accordingly, the printing device can reflect light off a target position on the printing medium, even when the state of unevenness on the printing medium varies along the moving direction of the carriage.

According to another aspect, the present disclosure provides a printing device including a head bar, a conveyor, and a first distance sensor. The head bar includes a plurality of heads. Each head has a nozzle and is configured to eject liquid from the nozzle. The conveyor is configured to convey a printing medium in a conveying direction to thereby move the printing medium relative to the head bar. The first distance sensor is configured to measure a distance between the heads and the printing medium. The first distance sensor is a specular reflection type distance sensor. The first distance sensor includes a light-emitting element and a light-receiving element. The light-emitting element and the light-receiving element are aligned in the conveying direction.

BRIEF DESCRIPTION OF THE DRAWINGS

The particular features and advantages of the embodiment(s) as well as other objects will become apparent from the following description taken in connection with the accompanying drawings, in which:

FIG. 2 is a schematic plan view for a horizontal cross section of a carriage;

FIG. 4 is a front view showing the states of several ink droplets that have been ejected from nozzles and deposited on a printing medium;

FIG. 6 is an explanatory diagram showing a case in which the distance to a printing medium having two portions with surfaces of different colors or materials is measured by the second distance sensor whose light-emitting element and light-receiving element are aligned in the left-right direction;

FIG. 7 is an explanatory diagram showing a case in which the distance to a printing medium having two portions with surfaces of different colors or materials is measured by the second distance sensor whose light-emitting element and light-receiving element are aligned in the front-rear direction;

FIG. 11 is a plan view showing a simplified example of a printing medium;

FIG. 14 is a plan view showing a simplified example of a printing medium;

DETAILED DESCRIPTION

First Embodiment

Figure 1:
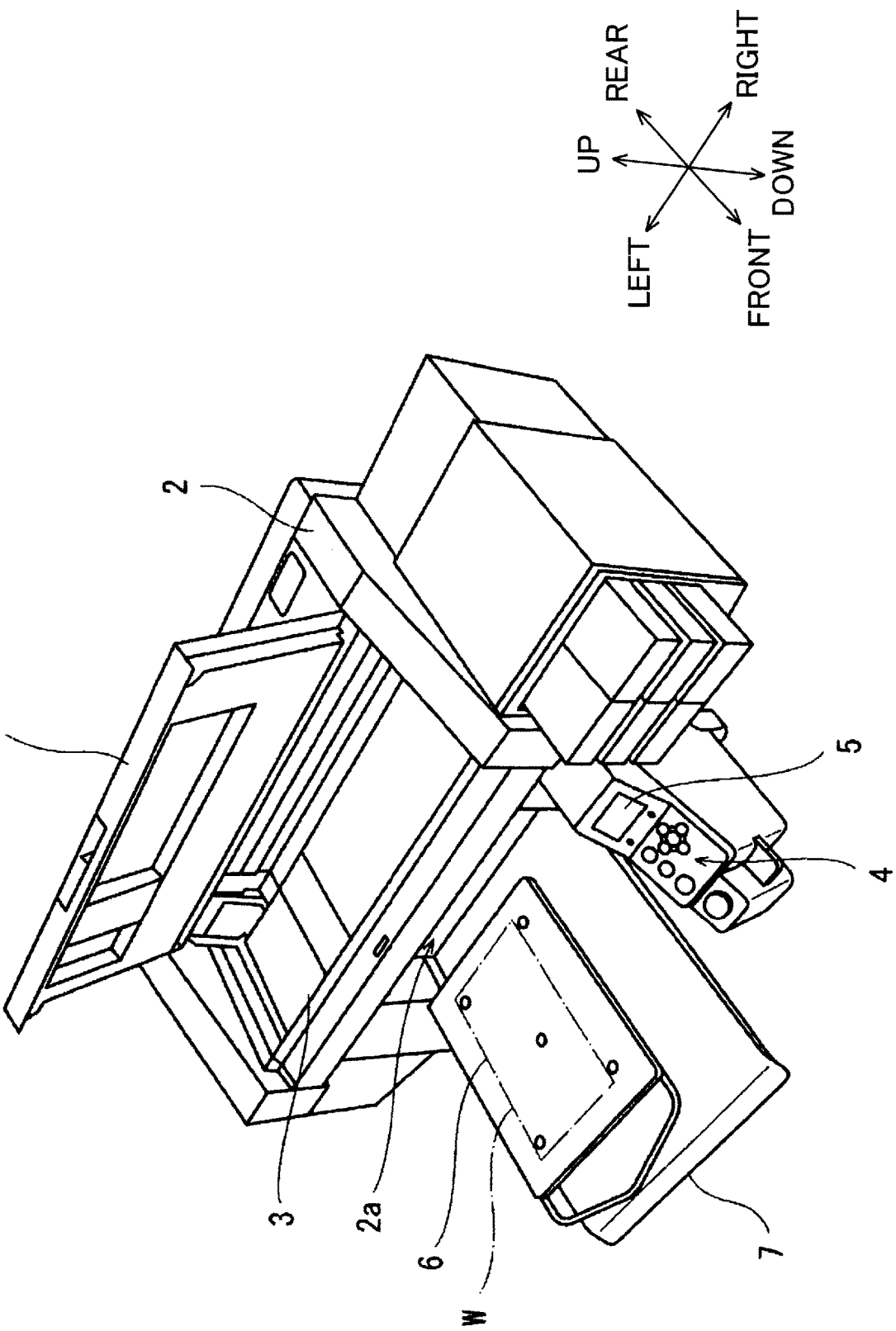
FIG. 1 is a schematic perspective view of a printing device.

Next, a printing device 1 according to a first embodiment of the present disclosure will be described while referring to the accompanying drawings. FIG. 1 is a schematic perspective view of the printing device 1. Directions used in the following description will follow the up, down, front, rear, left, and right arrows shown in FIG. 1. The left-right direction corresponds to the first direction, and the front-rear direction corresponds to the second direction.

As shown in FIG. 1, the printing device 1 according to the present embodiment is provided with a casing 2, a carriage 3, operating keys 4, a display unit 5, a tray 7, and a top cover 8. The casing 2 has a rectangular parallelepiped shape with surfaces facing in up, down, front, rear, left, and right directions. An opening 2a is formed in the front surface of the casing 2. The tray 7 is mounted on the bottom edge of the opening 2a. The tray 7 protrudes forward from the opening 2a and is configured to be movable in the front-rear direction. A conveying unit 6 is provided on top of the tray 7.

The conveying unit 6 has a plate shape with surfaces on the top and bottom. Since the conveying unit 6 is provided on the tray 7, the conveying unit 6 is configured to move in the front-rear direction. Thus, the conveying unit 6 can move toward the inside of the casing 2 or toward the outside of the casing 2 via the opening 2a. A printing medium W is placed on the top surface of the conveying unit 6. Examples of the printing medium W include paper, a resin member, and a metal member. The printing medium W is not limited to members with flat surfaces but may also be members with surface irregularities.

The operating keys 4 and display unit 5 are provided on the right side of the tray 7. The carriage 3 is disposed in the upper section of the casing 2 and is movable in the left-right direction. The top cover 8 is provided above the carriage 3 and is capable of being opened and closed. Opening the top cover 8 exposes the carriage 3 to allow maintenance operations to be carried out on the carriage 3 and other internal components.

FIG. 2 is a schematic plan view for a horizontal cross section of the carriage 3. While nozzles 33a and 34a, light-emitting elements 31a and 32a, and light-receiving elements 31b and 32b are provided in the bottom of the carriage 3 and are not visible in the plan view, these structures are indicated in FIG. 4 to facilitate understanding. The carriage 3 is provided with a case 3a. The case 3a accommodates a first distance sensor 31, a second distance sensor 32, two recording heads 33 and 34, a mist collector 35, and two ultraviolet irradiators 36 and 37. The recording heads 33 and 34 are juxtaposed in the front-rear direction, with the recording head 33 positioned to the rear of the recording head 34. The mist collector 35 is positioned on the right sides of the recording heads 33 and 34. The ultraviolet irradiators 36 and 37 are positioned to the right of the mist collector 35 and are juxtaposed in the front-rear direction, with the ultraviolet irradiator 36 positioned to the rear of the ultraviolet irradiator 37. The first distance sensor 31 and second distance sensor 32 are positioned on the right sides of the corresponding ultraviolet irradiators 36 and 37, with the first distance sensor 31 positioned to the rear of the second distance sensor 32.

The recording head 33 has a plurality of nozzles 33a. The recording head 34 has a plurality of nozzles 34a. Ultraviolet-curable ink is supplied to the recording heads 33 and 34 and is then ejected from the nozzles 33a and 34a. Examples of the UV-curable ink include clear ink and color ink. Examples of color ink are yellow, magenta, cyan, and black inks. The recording head 33 has a common electrode and individual electrodes corresponding to each of the nozzles 33a. Similarly, the recording head 34 has a common electrode and individual electrodes corresponding to each of the nozzles 34a. A controller 10 described later regulates the magnitude, application timing, and voltage waveform for the voltage applied to each individual electrode.

The mist collector 35 has a suction fan, for example. The mist collector 35 is positioned between the nozzles 33a and 34a and the first distance sensor 31 in the left-right direction. More specifically, the mist collector 35 is positioned between a group consisting of the nozzles 33a and 34a and a group consisting of the distance sensors 31 and 32 in the left-right direction. Each of the ultraviolet irradiators 36 and 37 has a UV lamp, for example. The ultraviolet irradiators 36 and 37 are positioned between the nozzles 33a and 34a and the first distance sensor 31 in the left-right direction. More specifically, the mist collector 35 is positioned between a group consisting of the nozzles 33a and 34a and a group consisting of the distance sensors 31 and 32 in the left-right direction.

The first distance sensor 31 is a specular reflection type distance sensor. The first distance sensor 31 has a light-emitting element 31a and a light-receiving element 31b. The light-emitting element 31a and light-receiving element 31b are aligned in the left-right direction. In the present embodiment, the light-emitting element 31a is positioned on the left side and the light-receiving element 31b on the right, but these positions may be reversed.

The second distance sensor 32 is a diffuse reflection type distance sensor. The second distance sensor 32 has a light-emitting element 32a and a light-receiving element 32b. The light-emitting element 32a and light-receiving element 32b are aligned in the front-rear direction. In the present embodiment, the light-emitting element 32a is on the rear side and the light-receiving element 32b on the front side, but these positions may be reversed.

Figure 3:
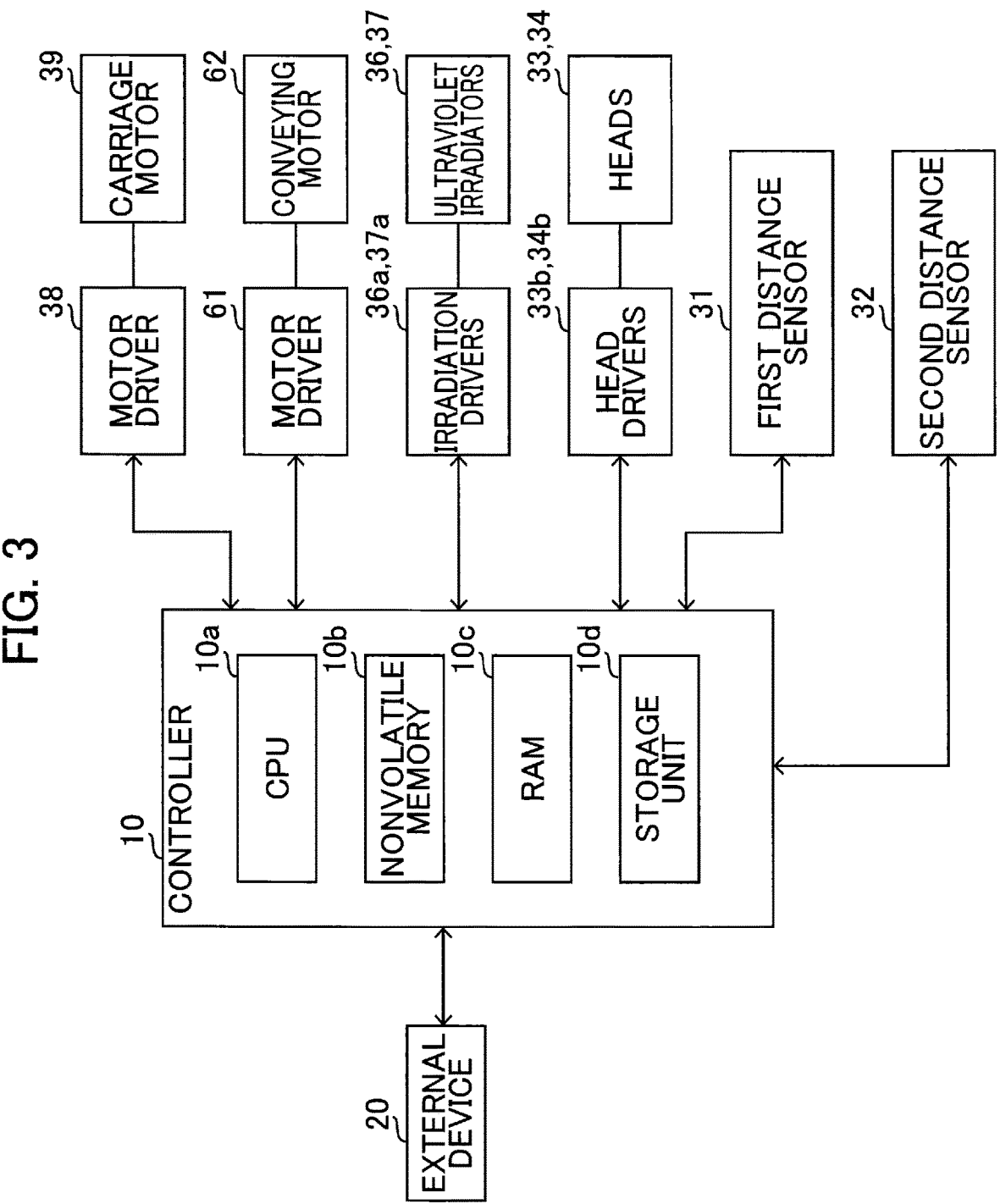
FIG. 3 is a block diagram showing the structure of a controller and its peripheral components.

FIG. 3 is a block diagram showing the structure of a controller 10 and its peripheral components. The printing device 1 is provided with the controller 10. The controller 10 has a CPU 10a, a nonvolatile memory 10b, a RAM 10c, a storage unit 10d, and the like. The nonvolatile memory 10b is ROM, EPROM, EEPROM, or a hard disk, for example. The nonvolatile memory 10b stores a control program for the printing device 1. The storage unit 10d is a rewritable storage medium. The storage unit 10d is EPROM, EEPROM, or a hard disk, for example. The CPU 10a reads the control program from the nonvolatile memory 10b into the RAM 10c to control the printing device 1. The storage unit 10d stores threshold values, distances from a printing medium W, and the like.

The CPU 10a outputs a drive signal to a motor driver 38, and thus the motor driver 38 drives a carriage motor 39. By driving the carriage motor 39, the carriage 3 moves in the left-right direction. The CPU 10a also outputs a drive signal to a motor driver 61, and thus the motor driver 61 drives a conveying motor 62. By driving the conveying motor 62, the conveying unit 6 moves in the front-rear direction.

The CPU 10a outputs a drive signal to an irradiation driver 36a, and thus the irradiation driver 36a drives the ultraviolet irradiator 36 to emit UV light. The CPU 10a also outputs a drive signal to an irradiation driver 37a, and thus the irradiation driver 37a drives the ultraviolet irradiator 37 to emit UV light.

The CPU 10a outputs a drive signal to a head driver 33b, and thus the head driver 33b drives the recording head 33 to eject ink. The CPU 10a also outputs a drive signal to a head driver 34b, and thus the head driver 34b drives the recording head 34 to eject ink.

The CPU 10a outputs an emission signal to the first distance sensor 31, and thus the first distance sensor 31 controls the light-emitting element 31a to emit light that is received by the light-receiving element 31b. The first distance sensor 31 outputs the quantity of received light detected by the light-receiving element 31b to the controller 10. Based on this quantity of received light, the CPU 10a calculates the distance between the printing medium W and the first distance sensor 31.

The CPU 10a outputs an emission signal to the second distance sensor 32, and thus the second distance sensor 32 controls the light-emitting element 32a to emit light that is received by the light-receiving element 32b. The second distance sensor 32 outputs the quantity of received light detected by the light-receiving element 32b to the controller 10. Based on this quantity of received light, the CPU 10a calculates the distance between the printing medium W and the second distance sensor 32.

The controller 10 is configured to communicate with an external device 20, such as a PC. When the controller 10 receives a print job (such as raster data) transmitted from the external device 20, the controller 10 controls the carriage 3, conveying unit 6, ultraviolet irradiators 36 and 37, recording heads 33 and 34, and the like to print on a printing medium W based on the received print job.

An example of measuring the distance to the printing medium W will be described next. Prior to starting the measurement, the printing medium W is placed in a first conveying position on the front side of the casing 2, i.e., outside the casing 2. The rear edge of the printing medium W is disposed below the carriage 3 and, hence, below the first distance sensor 31 and second distance sensor 32. The first conveying position is the position in the front-rear direction at which distance measurements are begun. Note that, in the following description, the first (and second) conveying position will also refer to the position of the conveying unit 6 when the printing medium W is in the first (and second) conveying position. When the measurements begin, the carriage 3 moves leftward from a carriage start position on the right side while the light-emitting element 31a of the first distance sensor 31 emits light and the light-receiving element 31b receives the reflected light. The CPU 10a calculates the distance between the first distance sensor 31 and the printing medium W based on the quantity of light received by the light-receiving element 31b.

Alternatively to or simultaneously with the first distance sensor 31, the light-emitting element 32a of the second distance sensor 32 emits light and the light-receiving element 32b receives the reflected light. The CPU 10a calculates the distance between the second distance sensor 32 and the printing medium W based on the quantity of light received by the light-receiving element 32b. After the carriage 3 has reached a carriage end position on the left side, the conveying unit 6 moves rearward by a prescribed distance and the carriage 3 returns to the carriage start position. This process is repeated until the printing medium W reaches a second conveying position on the rear side, i.e., inside the casing 2. The distance between the carriage start position and the carriage end position is at least equivalent to the left-right dimension of the printing medium W. The distance between the first conveying position and the second conveying position is at least equivalent to the front-rear dimension of the printing medium W.

Next, an example of printing on a printing medium W will be described. Before the start of printing, the printing medium W is placed in the second conveying position inside the casing 2. Once printing begins, the carriage 3 moves leftward from the carriage start position while the recording heads 33 and 34 eject ink and the mist collector 35 collects ink mist. The ultraviolet irradiators 36 and 37 irradiate UV light toward ink printed on the printing medium W, whereby the ink is cured by the UV light. After the carriage 3 has reached the carriage end position on the left side, the conveying unit 6 moves frontward by a prescribed distance and the carriage 3 returns to the carriage start position. This process is repeated until printing has been completed across the entire front-rear dimension of the printing medium W.

FIG. 4 is a front view showing the states of several ink droplets that have been ejected from the nozzles 33a and 34a and deposited on a printing medium W. The printing medium W shown in FIG. 4 has a top-surface right portion W1, a top-surface left portion W3, and a top-surface center portion W2. The top-surface right portion W1 slopes downward toward to the right. The top-surface left portion W3 slopes downward toward the left. The top-surface center portion W2 is substantially flat. Ink travels downward to the left along an oblique path owing to a leftward force applied by the moving carriage 3 and a downward force applied by the ejection from the recording heads 33 and 34. Note that the quantity of ink ejected from each of the nozzles 33a and 34a is uniform.

The left-right dimensions of areas in which ink is deposited (black dots in FIG. 4) are shortest in the top-surface right portion W1 and longest in the top-surface left portion W3. Thus, if the printing medium W has an uneven surface, differences in printing density occur in the uneven areas. Therefore, in a distance measuring and printing process described later, efforts are made to suppress differences in printing density by adjusting the quantities of ejected ink and the like based on measurement results from the distance sensors 31 and 32.

Figure 5:
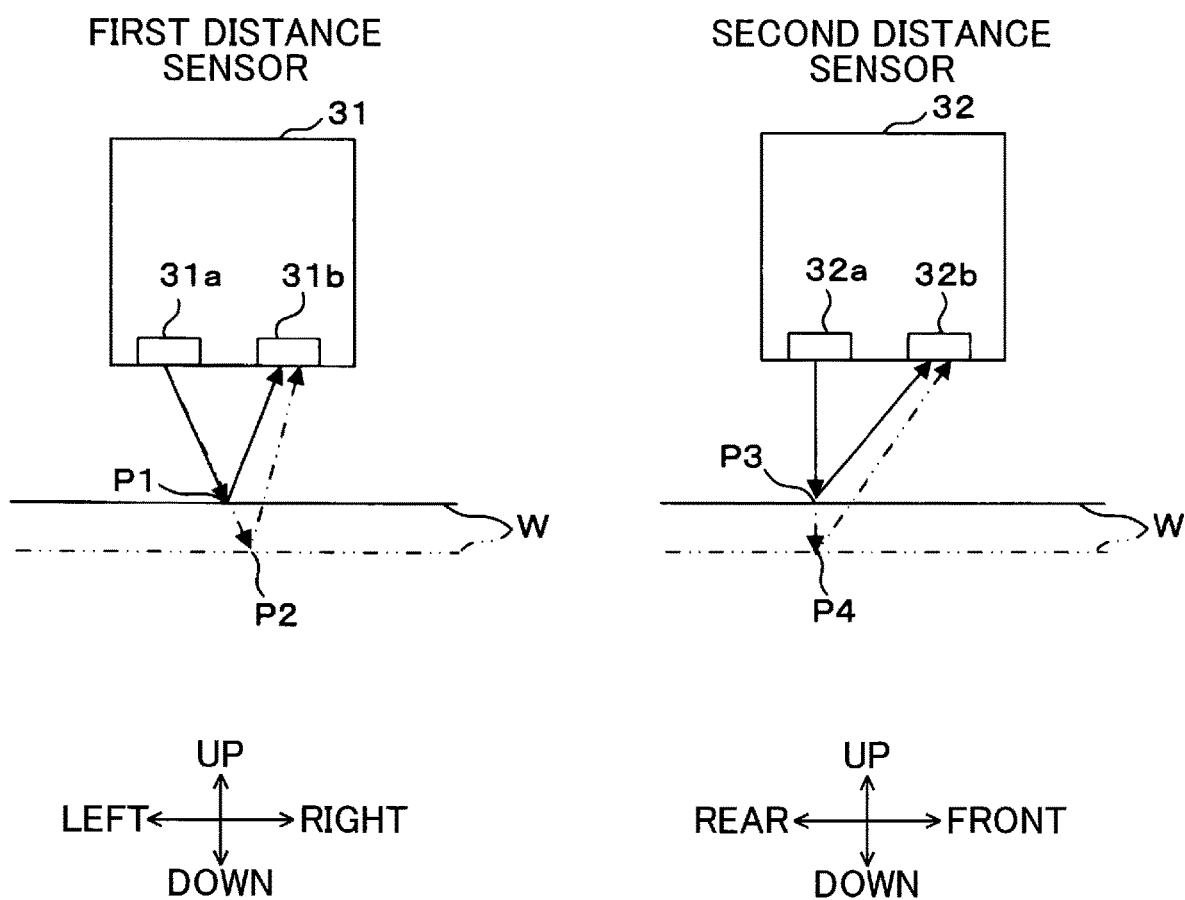
FIG. 5 is an explanatory diagram illustrating the characteristics of a first distance sensor and a second distance sensor.

FIG. 5 is an explanatory diagram illustrating the characteristics of the first distance sensor 31 and second distance sensor 32. The first distance sensor 31 is a specular reflection type distance sensor and the second distance sensor 32 is a diffuse reflection type distance sensor. In the following description, a first position and second position denote vertical positions of the surface of the printing medium W illustrated in FIG. 5, where the first position is higher than the second position.

When the surface of the printing medium W is in the first position, light irradiated from the light-emitting element 31a of the first distance sensor 31 is reflected off a position P1 and then reaches the light-receiving element 31b. When the surface of the printing medium W is in the second position, light irradiated from the light-emitting element 31a of the first distance sensor 31 is reflected off a position P2 and then reaches the light-receiving element 31b. As shown in FIG. 5, the position P2 is offset to the right of the position P1. Hence, the measurement point is susceptible to deviation when measuring distances with the first distance sensor 31.

On the other hand, when the surface of the printing medium W is in the first position, light irradiated from the light-emitting element 32a of the second distance sensor 32 is reflected off a position P3 and then arrives at the light-receiving element 32b. When the surface of the printing medium W is in the second position, light irradiated from the light-emitting element 32a of the second distance sensor 32 is reflected off a position P4 and then reaches the light-receiving element 32b. As shown in FIG. 5, the position P4 is approximately the same position as the position P3 in the front-rear direction. Hence, the measurement point tends not to deviate when measuring distance with the second distance sensor 32.

If the surface of the printing medium W is predisposed to diffuse reflection, that is, if the surface of the printing medium W has been subjected to mirror finishing, for example, light from the light-emitting element 32*a* of the second distance sensor 32 tends to have difficulty reaching the light-receiving element 32*b*. Consequently, the amount of light received by the light-receiving element 32*b* is prone to variation, which can affect distance measurements. On the other hand, even when the surface of the printing medium W is susceptible to diffuse reflection, light from the light-emitting element 31*a* of the first distance sensor 31 tends to easily reach the light-receiving element 31*b*. As a result, distance measurements are less likely to be influenced.

Therefore, in the distance measuring and printing process described later, the second distance sensor 32 is used to measure distances when the quantity of light received is not abnormal, and the first distance sensor 31 is used to measure distances when the quantity of received light is abnormal.

FIG. 6 is an explanatory diagram showing a case in which the light-emitting element 32*a* and light-receiving element 32*b* of the second distance sensor 32 are aligned in the left-right direction and the second distance sensor 32 measures the distance to a printing medium W having two portions with surfaces of different colors or materials. In FIG. 6, the surfaces of the printing medium W having different colors or materials are depicted by a shaded region and a non-shaded region. The shaded region and non-shaded region are juxtaposed in the left-right direction. When the second distance sensor 32 moves leftward while measuring the distance to the printing medium W, diffuse reflection tends to occur at the boundary region between the different colors or materials, and hence, measurement errors tend to occur.

FIG. 7 is an explanatory diagram showing a case in which the light-emitting element 32*a* and light-receiving element 32*b* of the second distance sensor 32 are aligned in the front-rear direction and the second distance sensor 32 measures the distance to a printing medium W having two portions with surfaces of different colors or materials. In FIG. 7, the surfaces of the printing medium W having different colors or materials are depicted by a shaded region and a non-shaded region. The shaded region and non-shaded region are juxtaposed in the left-right direction. When the second distance sensor 32 moves leftward while measuring the distance to the printing medium W, diffuse reflection tends not to occur at the boundary region between the different colors or materials, and hence, measurement errors tend not to occur. Accordingly, the light-emitting element 32*a* and light-receiving element 32*b* in the present embodiment are aligned in the front-rear direction.

Figure 8:
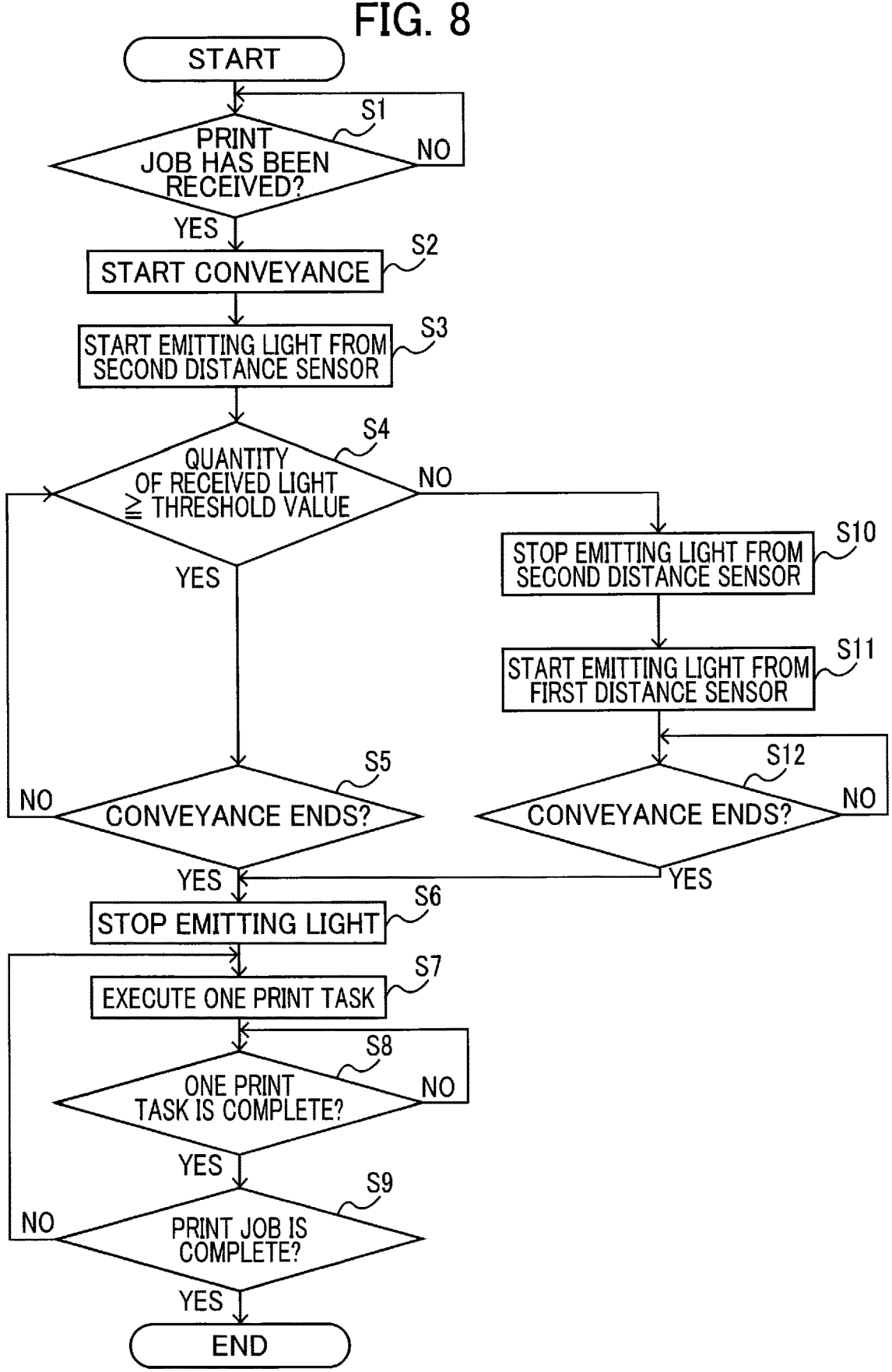
FIG. 8 is a flowchart illustrating steps in a distance measuring and printing process performed on the controller.

FIG. 8 is a flowchart illustrating steps in a distance measuring and printing process performed on the controller 10. In the initial state at the beginning of this process, the conveying unit 6 and printing medium W are positioned in the first conveying position. In S1 the CPU 10*a* determines whether a print job has been received. When a print job has not been received (S1: NO), the CPU 10*a* continually loops back to the determination in S1. When a print job has been received (S1: YES), in S2 the CPU 10*a* begins conveying the printing medium W. At this time, the conveying unit 6 is conveyed rearward a prescribed distance from the first conveying position.

In S3 the CPU 10*a* controls the second distance sensor 32 to emit light while moving the carriage 3 from the carriage start position to the carriage end position. The measurement results of the second distance sensor 32 are sequentially stored in the storage unit 10*d*. In S4 the CPU 10*a* determines whether the quantity of received light detected by the light-receiving element 32*b* is greater than or equal to a threshold value. If the quantity of received light is greater than or equal to the threshold value (S4: YES), in S5 the CPU 10*a* determines whether the conveying unit 6 has reached the second conveying position, i.e., whether conveyance of the conveying unit 6 has been completed. If conveyance of the conveying unit 6 has not been completed (S5: NO), the CPU 10*a* returns to the process in step S4. That is, in the process from step S2 to S5, the CPU 10 alternately repeats the following two processes: the process of measuring distances from the printing medium M (i.e., the process of moving the carriage 3 from the carriage start position to the carriage end position while emitting light from the second distance sensor 32), and the process of conveying the conveying unit 6 (i.e., the printing medium M) rearward by the prescribed distance. The conveying process of the conveying unit 6 from step S2 to step S5, i.e., the conveying process from the first conveying position to the second conveying position corresponds to a second conveying process for conveying the printing medium W without ejecting liquid from nozzles. Further, the conveying direction of the printing medium M (i.e., the conveying direction of the conveying unit 6) in the conveying process from step S2 to step S5 is an example of the fourth direction and also an example of the fifth direction. This conveying direction in the present embodiment is the direction from the front to the rear as described above.

If conveyance of the conveying unit 6 has been completed (S5: YES), in S6 the CPU 10*a* controls the second distance sensor 32 to stop emitting light. In S7 the CPU 10*a* executes one printing task. A printing task is a unit constituting part of a print job. Specifically, a printing task is a liquid (ink) ejection process in which the recording heads 33 and 34 eject liquid (ink) while moving leftward across the left-right dimension of the printing medium W.

During this process of ejecting ink, the CPU 10*a* adjusts the quantity of ink ejected and the like based on measurement results from the distance sensors. For example, the CPU 10*a* adjusts the quantity of ink ejection by adjusting the magnitude or waveform of voltage applied to common electrodes in the recording heads 33 and 34. The CPU 10*a* also adjusts the timing at which voltage is applied to the common electrodes to transpose the impact positions for ink on the printing medium W. The CPU 10*a* may also adjust the moving velocity of the carriage 3. Through these adjustments the CPU 10*a* can suppress differences in printing density.

In S8 the CPU 10*a* determines whether one printing task has completed. When one printing task is not yet complete (S8: NO), the CPU 10*a* continually loops back to the determination in S8. When the printing task is complete (S8: YES), in S9 the controller 10 determines whether the entire print job is complete. If the print job is not complete (S9: NO), the CPU 10*a* returns to the process in step S7. When the print job is complete (S9: YES), the CPU 10*a* ends the printing process.

In the process from step S7 to step S9, the CPU 10*a* executes a printing task while the conveying unit 6 conveys the printing medium W from the second conveying position to the first conveying position, i.e., while conveying the printing medium W from the rear side toward the front. More specifically, in the process from step S7 to S9, the CPU 10 alternately repeats the following two processes: the process of executing one printing task, and the process of conveying the conveying unit 6 (i.e., the printing medium M) frontward by the prescribed distance. Thus, the conveying unit 6 reaches the first conveying position when the print job is completed. This conveying process of the conveying unit 6, i.e., the process of conveying the printing medium W from the second conveying position to the first conveying position corresponds to the first conveying process for conveying the printing medium W while liquid is ejected from nozzles. Further, the conveying direction of the printing medium M (i.e., the conveying direction of the conveying unit 6) in the conveying process from step S7 to step S9 is an example of the third direction. This conveying direction in the present embodiment is the direction from the rear to the front as described above.

On the other hand, if the CPU 10a determines in S4 that the quantity of received light is less than the threshold value (S4: NO), in S10 the CPU 10a controls the second distance sensor 32 to stop emitting light and in S11 controls the first distance sensor 31 to emit light. The measurement results from the first distance sensor 31 are stored in the storage unit 10d. As described above, when the quantity of received light is less than the threshold value, the measurement results can be affected by diffuse reflection off the surface of the printing medium W. Accordingly, the first distance sensor 31 is used in place of the second distance sensor 32 since distance measurements by the first distance sensor 31 are less likely to be affected even when the surface of the printing medium W is prone to diffuse reflection. In S12 the CPU 10a determines whether the conveying unit 6 has reached the second conveying position, i.e., whether conveyance of the conveying unit 6 has been completed. When conveyance of the conveying unit 6 has not been completed (S12: NO), the CPU 10a continually loops back to the determination in S12. Once conveyance is complete (S12: YES), the CPU 10a advances to the process in step S6 described above.

In the first embodiment, the recording heads 33 and 34, the mist collector 35, the ultraviolet irradiators 36 and 37, and the distance sensors 31 and 32 are arranged in order from left to right, but these components may be arranged in the same order from right to left instead. In this case, the carriage start position and carriage end position of the carriage 3 are reversed left to right. Note that the numbers of recording heads and ultraviolet irradiators may be singular or three or greater.

In the printing device 1 according to the first embodiment, the light-emitting element 31a and light-receiving element 31b of the first distance sensor 31 are aligned in the left-right direction, i.e., the direction in which the carriage 3 moves. Therefore, the first distance sensor 31 can reflect light off target positions on the printing medium, even when the unevenness of the recording medium varies along the moving direction.

Further, the light-emitting element 32a and light-receiving element 32b of the second distance sensor 32 are aligned in a direction crossing the moving direction of the carriage 3. In the present embodiment, the light-emitting element 32a and light-receiving element 32b are aligned in the front-rear direction, i.e., a direction orthogonal to the moving direction of the carriage 3. Hence, when the second distance sensor 32 performs distance measurements to a printing medium W having two portions with surfaces of different colors or materials, diffuse reflection is unlikely to occur at the boundary region between the two portions and, hence, is unlikely to lead to measurement errors.

Further, the ultraviolet irradiators 36 and 37 are positioned between the nozzles 33a and 34a and the first distance sensor 31 in the left-right direction. Therefore, ink ejected from the nozzles 33a and 34a is cured by UV light irradiated from the ultraviolet irradiators 36 and 37 immediately after impacting the printing medium W.

Further, since the mist collector 35 is positioned between the nozzles 33a and 34a and the first distance sensor 31 in the left-right direction, the mist collector 35 can collect ink mist immediately after ink has been ejected from the nozzles 33a and 34a.

The CPU 10a also controls the first distance sensor 31 or second distance sensor 32 to begin measuring the distance between the distance sensor and the printing medium W when conveyance of the printing medium W starts and stops these distance measurements when conveyance of the printing medium W ends (see steps S2-S5 and S10-S12). In this way, the CPU 10a can measure distances across the entire surface of the printing medium W.

The first distance sensor 31 is also disposed to the rear side of the second distance sensor 32. That is, the first distance sensor 31 is disposed downstream of the second distance sensor 32 in the direction for conveying the printing medium W in the second conveying process (from the front toward the rear). If the first distance sensor 31 were disposed on the front side (upstream side) of the second distance sensor 32, it would be necessary to convey the printing medium W in the reverse direction (from rear to front) after switching distance sensors from the second distance sensor 32 to the first distance sensor 31 in order to measure the portion of the printing medium W disposed on the rear side (downstream side) of the first distance sensor 31 that was not measured by the second distance sensor 32. Since the first distance sensor 31 is disposed on the rear side of the second distance sensor 32 in the present embodiment, there is no need to convey the printing medium W in the reverse direction in such cases.

Second Embodiment

Figure 9:
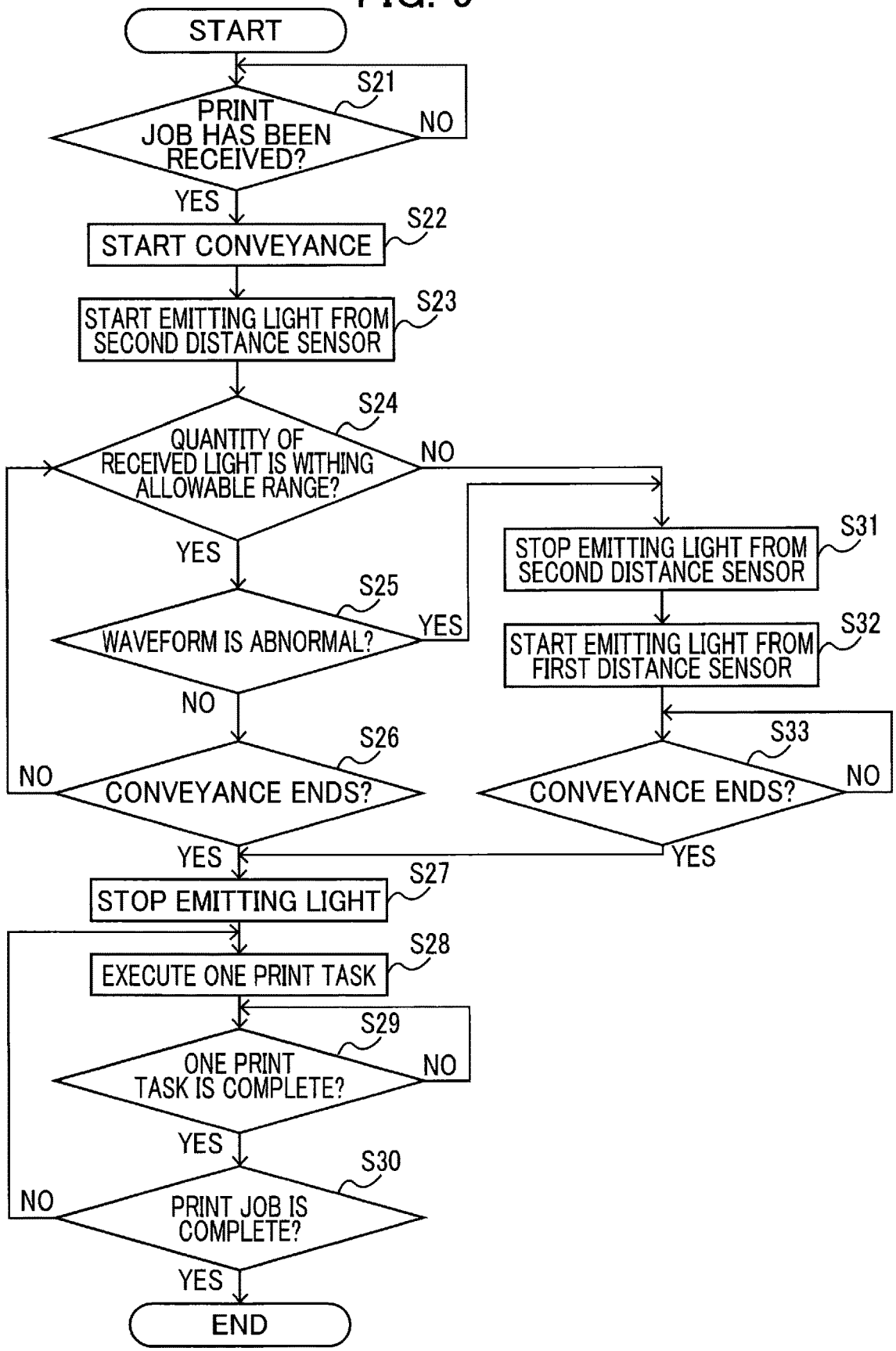
FIG. 9 is a flowchart illustrating steps in a distance measuring and printing process performed on a controller.

Next, a printing device 1 according to a second embodiment of the present disclosure will be described with reference to the drawings. Components in structures according to the second embodiment that are identical to those in the first embodiment are designated with the same reference numerals to avoid duplicating description. FIG. 9 is a flowchart illustrating steps in a distance measuring and printing process performed on the controller 10.

In the flowchart of FIG. 9, steps S21-S23 are identical to S1-S3 in FIG. 8, S27-S30 are identical to S6-S9 in FIG. 8, and S31-S33 are identical to S10-S12 in FIG. 8. Hence, a detailed description of these steps has been omitted.

After controlling the second distance sensor 32 to irradiate light in step S23, in S24 the CPU 10a determines whether the quantity of received light detected by the light-receiving element 32b is within an allowable range. In other words, the CPU 10a determines whether the output value from the light-receiving element 32b of the second distance sensor 32 is within an allowable range. The allowable range is pre-stored in the storage unit 10d and has a maximum allowable value and a minimum allowable value. When the quantity of received light is greater than the maximum allowable value or less than the minimum allowable value, diffuse reflection off the surface of the printing medium W could potentially affect distance measurements. In other words, the output value from the light-receiving element 32b of the second distance sensor 32 is greater than the maximum allowable value or less than the minimum allowable value, diffuse reflection off the surface of the printing medium W could potentially affect distance measurements.

When the quantity of received light is not within the allowable range (S24: NO), in S31 the CPU 10a stops the second distance sensor 32 from emitting light. In S32 the CPU 10a controls the first distance sensor 31 to emit light. Measurement results from the first distance sensor 31 are stored in the storage unit 10d. However, when the quantity of received light is within the allowable range (S24: YES), in S25 the CPU 10a determines whether the output waveform from the light-receiving element 32b of the second distance sensor 32 is abnormal. For example, an output waveform with no abnormalities denotes a waveform with smooth curves, while an abnormal output waveform refers to a sawtooth (zigzag) waveform. When the output waveform is abnormal (S25: YES), the CPU 10a advances to S31 described above. In other words, when an abnormal waveform is outputted, the diffuse reflection can potentially affect distance measurements.

However, if the output waveform is not abnormal (S25: NO), in S26 the CPU 10a determines whether the conveying unit 6 has arrived at the second conveying position, i.e., whether conveyance of the conveying unit 6 has been completed. If conveyance is not complete (S26: NO), the CPU 10a repeats the process from step S24. When conveyance is complete (S26: YES), the CPU 10a advances to step S27.

Thus, when the output value from the second distance sensor 32, i.e., the quantity of received light detected by the second distance sensor 32 is outside the allowable range in the printing device 1 according to the second embodiment, the second distance sensor 32 is stopped and the first distance sensor 31 is driven. Hence, measurement errors are less likely to occur.

Further, when abnormalities are present in the waveform outputted from the second distance sensor 32, the second distance sensor 32 is stopped and the first distance sensor 31 is driven. Hence, measurement errors are less likely to occur.

Third Embodiment

Next, a printing device 1 according to a third embodiment of the present disclosure will be described with reference to the drawings. Components in structures according to the third embodiment that are identical to those in the first or second embodiment are designated with the same reference numerals to avoid duplicating description.

Figure 10:
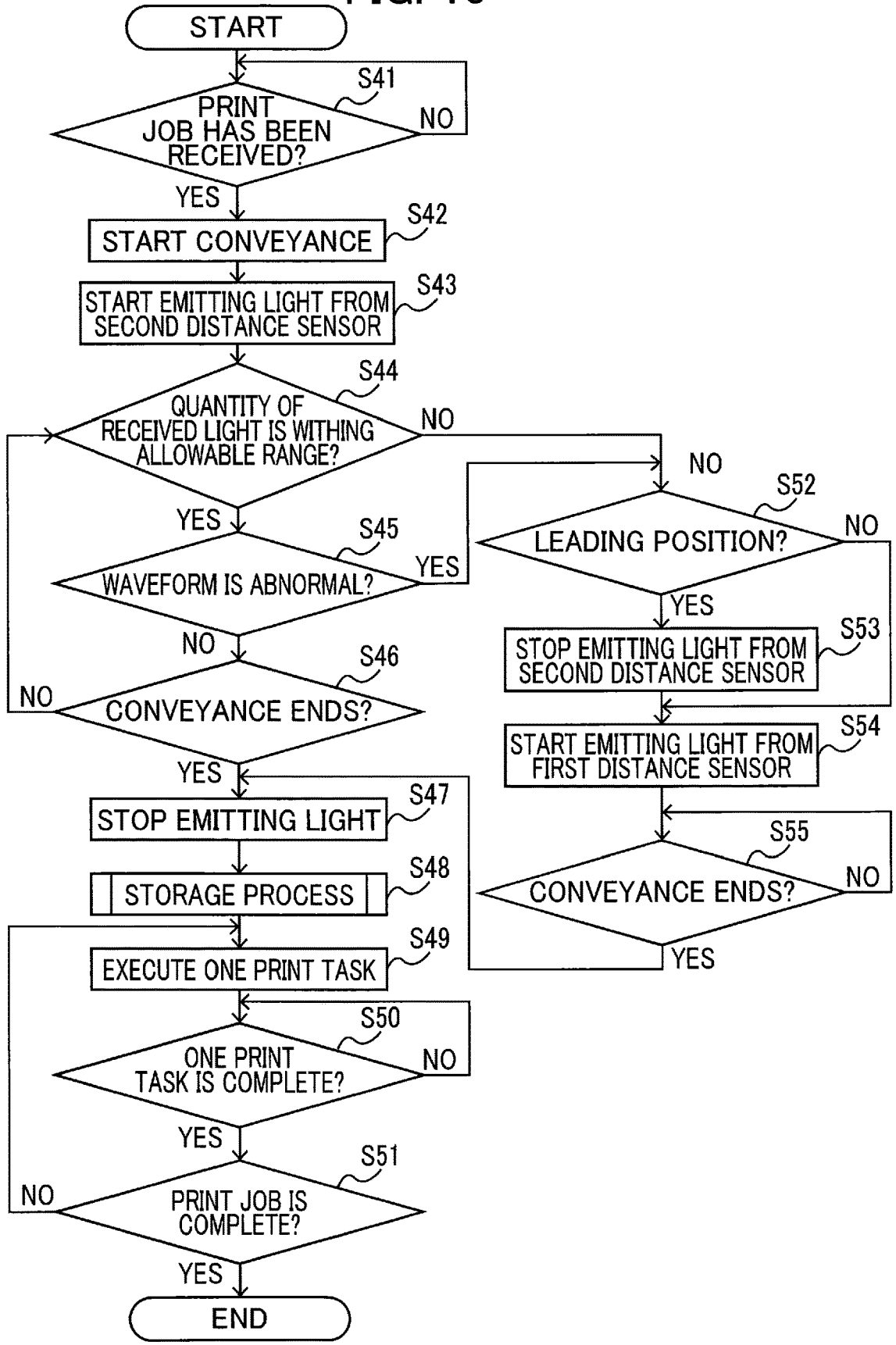
FIG. 10 is a flowchart illustrating steps in a distance measuring and printing process performed on a controller.

FIG. 10 is a flowchart illustrating steps in a distance measuring and printing process performed on the controller 10. In the flowchart shown in FIG. 10, S41-S47 and S49-S51 are identical to S21-S30 in FIG. 9. Therefore, a detailed description of these steps has been omitted.

When the quantity of received light is not within the allowable range (S44: NO) or when the output waveform is abnormal (S45: YES), in S52 the CPU 10a determines whether the conveying unit 6 is in the first conveying position, i.e., whether the measurement portion by the second distance sensor 32 is the leading portion of the printing medium W in the conveying direction for the distance measurement. When the conveying unit 6 is in the first conveying position (S52: YES), i.e., when a diffuse reflection region is present in the rear edge portion (i.e., the leading portion) of the printing medium W, in S53 the CPU 10a controls the second distance sensor 32 to stop light emission and in S54 controls the first distance sensor 31 to emit light. In S55 the CPU 10a determines whether the conveying unit 6 has reached the second conveying position, i.e., whether conveyance of the conveying unit 6 has been completed. While conveyance has not ended (S55: NO), the CPU 10a continually loops back to the determination in S55.

On the other hand, when the conveying unit 6 is not in the first conveying position in step S52 (S52: NO), i.e., when a diffuse reflection region is not present in the rear edge portion of the printing medium W, in S54 the CPU 10a controls the first distance sensor 31 to emit light. Thus, distance measurements are performed using light emitted from both the first distance sensor 31 and second distance sensor 32.

FIG. 11 is a plan view showing a simplified example of a printing medium W. The shading in FIG. 11 denotes a diffuse reflection region K. The diffuse reflection region K is present only in the front portion of the printing medium W. When the conveying unit 6 is not in the first conveying position (S52: NO), there is a possibility that the diffuse reflection region K is present only in the front portion of the printing medium W, as in the example of FIG. 11. In such cases, the CPU 10a performs distance measurements using the second distance sensor 32 on the rear portion of the printing medium W, which has no diffuse reflection region K, and performs measurements using both the first distance sensor 31 and second distance sensor 32 for the diffuse reflection region K.

Once conveyance has ended (S55: YES), in S47 the CPU 10a controls the first distance sensor 31 or the first distance sensor 31 and second distance sensor 32 to stop light emissions. In S48 the CPU 10a executes a storage process and subsequently advances to S49.

Figure 12:
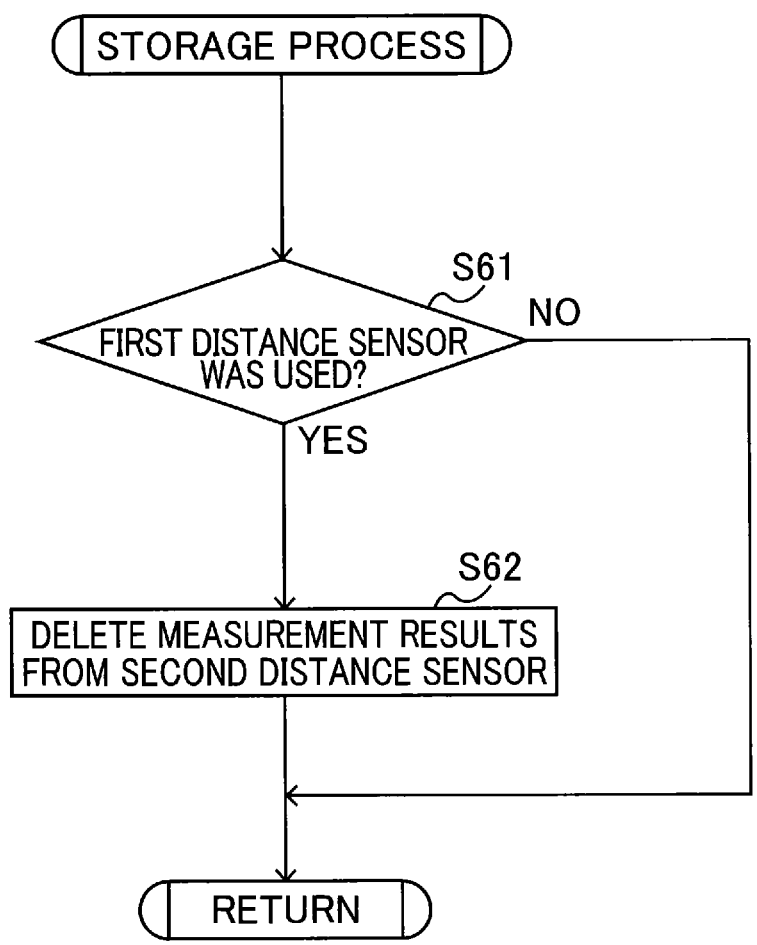
FIG. 12 is a flowchart illustrating steps in a storage process.

FIG. 12 is a flowchart illustrating steps in the storage process of S48. In S61 of FIG. 12, the CPU 10a determines whether the first distance sensor 31 was used to perform distance measurements. If the first distance sensor 31 was not used (S61: NO), the CPU 10a advances to S49 in FIG. 10.

However, if the first distance sensor 31 was used (S61: YES), in S62 the CPU 10a deletes measurement results received from the second distance sensor 32 for the diffuse reflection region K from the storage unit 10d, leaving only the measurement results received from the first distance sensor 31 for the diffuse reflection region K in the storage unit 10d. Subsequently, the CPU 10a advances to S49 of FIG. 10.

The printing device 1 according to the third embodiment controls both the first distance sensor 31 and second distance sensor 32 to perform distance measurements when the output value from the second distance sensor 32 (i.e., the quantity of received light detected by the second distance sensor 32) is outside the allowable range and when the measurement portion by the second distance sensor 32 is not at the leading portion of the printing medium W. In other words, the second distance sensor 32 is used to measure distances in regions other than a diffuse reflection region K, and the first distance sensor 31 and second distance sensor 32 are used to perform distance measurements in the diffuse reflection region K. Accordingly, since the first distance sensor 31 is used only for the diffuse reflection region K, measurement errors can be suppressed.

Further, the first distance sensor 31 is controlled to measure distances between the recording heads 33 and 34 and the diffuse reflection region K, i.e., the regions in which the waveform outputted from the second distance sensor 32 is abnormal, thereby suppressing the effects of diffuse reflection on the measurement results.

The CPU 10a stores output values (i.e., measurement results) from both the first distance sensor 31 and second distance sensor 32 in the storage unit 10d. Subsequently, the CPU 10a deletes, from the storage unit 10d, the output values (i.e., measurement results) for the diffuse reflection region K from the second distance sensor 32 so that only output values (i.e., measurement results) for the diffuse reflection region K from the first distance sensor 31 remain stored in the storage unit 10d. In this way, the CPU 10a can keep measurement results in the storage unit 10d having the least measurement errors for the diffuse reflection region K.

Fourth Embodiment

Figure 13:
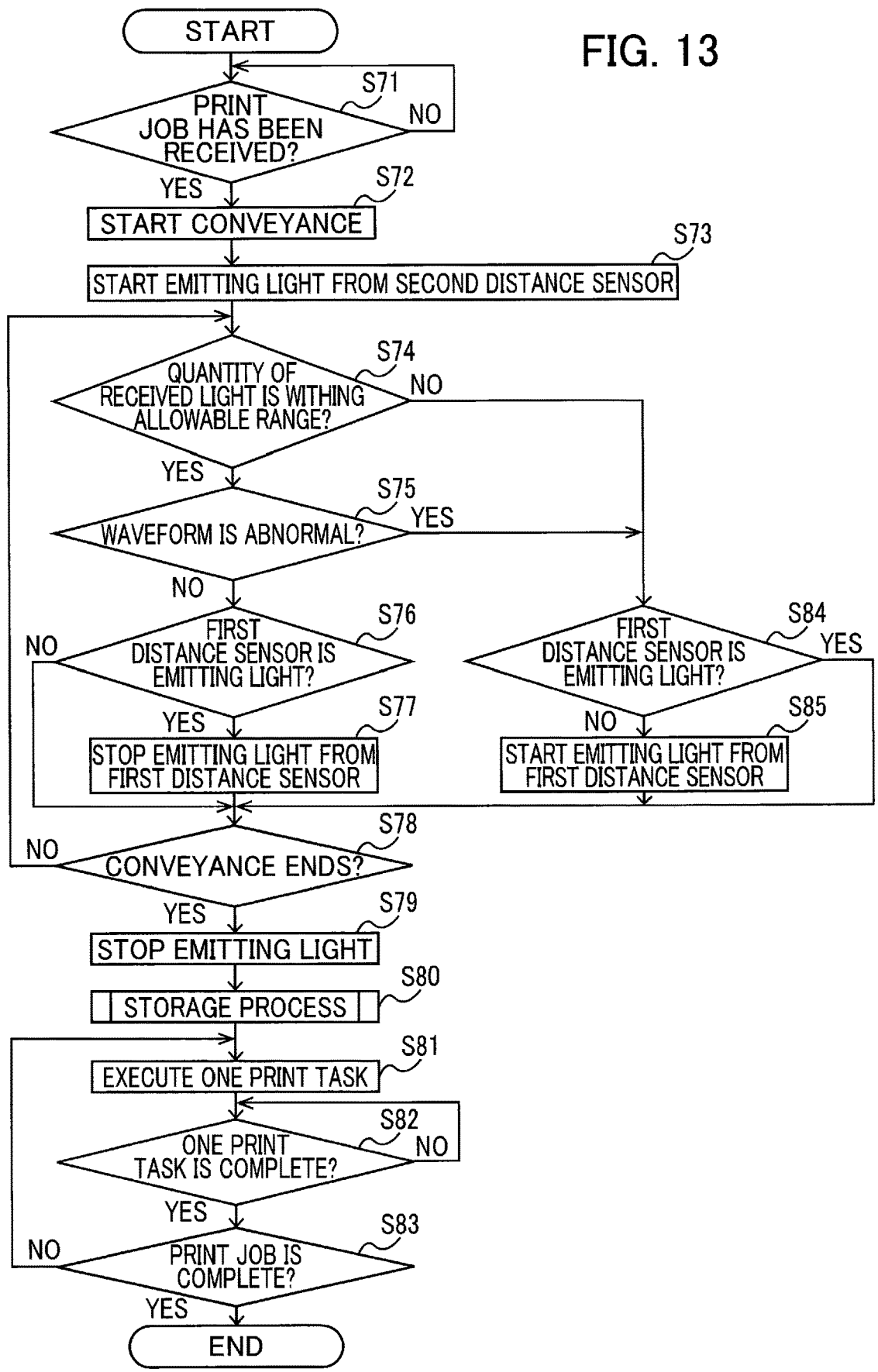
FIG. 13 is a flowchart illustrating steps in a distance measuring and printing process performed on a controller.

Next, a printing device 1 according to a fourth embodiment of the present disclosure will be described while referring to the drawings. Components in structures according to the fourth embodiment that are identical to those in the first through third embodiments are designated with the same reference numerals to avoid duplicating description. FIG. 13 is a flowchart illustrating steps in the distance measuring and printing process performed on the controller 10. In the flowchart shown in FIG. 13, S71-S75 and S79-S83 are identical to S41-S45 and S47-S51 in FIG. 10. Therefore, a detailed description of these steps has been omitted.

When the quantity of received light is not within the allowable range (S74: NO) or when the output waveform is abnormal (S75: YES), in S84 the CPU 10a determines whether the first distance sensor 31 is emitting light. If the first distance sensor 31 is not emitting light (S84: NO), in S85 the CPU 10a controls the first distance sensor 31 to emit light. In other words, the CPU 10a controls the first distance sensor 31 and second distance sensor 32 to measure distances. In S78 the CPU 10a determines whether the conveying unit 6 has reached the second conveying position, i.e., whether conveyance of the conveying unit 6 has been completed. However, if the CPU 10a determines in step S84 that the first distance sensor 31 is emitting light (S84: YES), the CPU 10a advances directly to step S78.

On the other hand, if the output waveform is not abnormal (S75: NO), in S76 the CPU 10a determines whether the first distance sensor 31 is emitting light. If the first distance sensor 31 is emitting light (S76: YES), in S77 the CPU 10a controls the first distance sensor 31 to stop light emission. By stopping the emission of light from the first distance sensor 31, only the second distance sensor 32 performs distance measurements in regions other than the diffuse reflection region K. In S78 the CPU 10a determines whether the conveying unit 6 has reached the second conveying position, i.e., whether conveyance of the conveying unit 6 has been completed.

However, if the CPU 10a determines in step S76 that the first distance sensor 31 is not emitting light (S76: NO), the CPU 10a advances directly to step S78. If the CPU 10a determines in step S78 that conveyance is not complete (S78: NO), the CPU 10a returns to S74. When conveyance is complete (S78: YES), in S79 the CPU 10a stops light emission from the second distance sensor 32 or from the first distance sensor 31 and second distance sensor 32.

FIG. 14 is a plan view showing a simplified example of the printing medium W. Shading in FIG. 14 denotes a diffuse reflection region K. In this example, the diffuse reflection region K is formed only in a partial region of the printing medium W along the left-right dimension. In such cases, both the first distance sensor 31 and second distance sensor 32 in the fourth embodiment are used to perform distance measurements in the diffuse reflection region K, while only the second distance sensor 32 is used to perform distance measurements in regions other than the diffuse reflection region K.

Hence, the storage unit 10d stores measurement results from the first distance sensor 31 and second distance sensor 32 for the diffuse reflection region K, but only stores measurement results from the second distance sensor 32 for regions other than the diffuse reflection region K. In the storage process of step S79, the CPU 10a deletes measurement results from the second distance sensor 32 stored in the storage unit 10d for the diffuse reflection region K, keeping only measurement results from the first distance sensor 31 for the diffuse reflection region K in the storage unit 10d.

Fifth Embodiment

Figure 15:
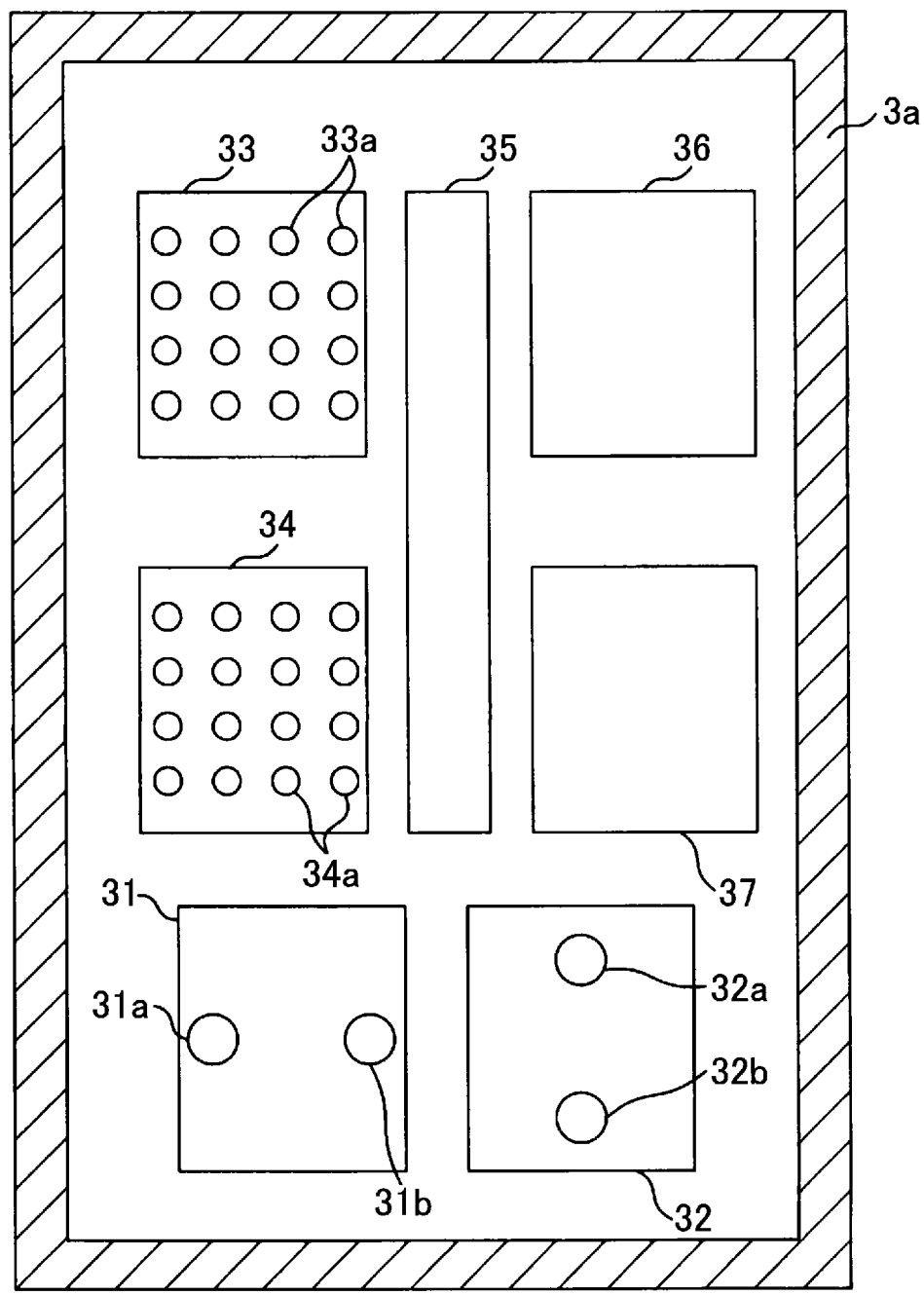
FIG. 15 is a schematic plan view for a horizontal cross section of a carriage.

Next, a printing device 1 according to a fifth embodiment of the present disclosure will be described while referring to the drawings. Components in structures according to the fifth embodiment that are identical to those in the first through fourth embodiments are designated with the same reference numerals to avoid duplicating description. FIG. 15 is a schematic plan view for a horizontal cross section of the carriage 3. In the fifth embodiment, the first distance sensor 31 and second distance sensor 32 are both disposed on the front side of the carriage 3 and are aligned in the left-right direction. Thus, the measurement position by the first distance sensor 31 is substantially the same as the measurement position by the second distance sensor 32 in the front-rear direction. Accordingly, whether the first distance sensor 31 or the second distance sensor 32 is used, measurement results can be obtained for the approximate same front-rear position.

Sixth Embodiment

Figure 16:
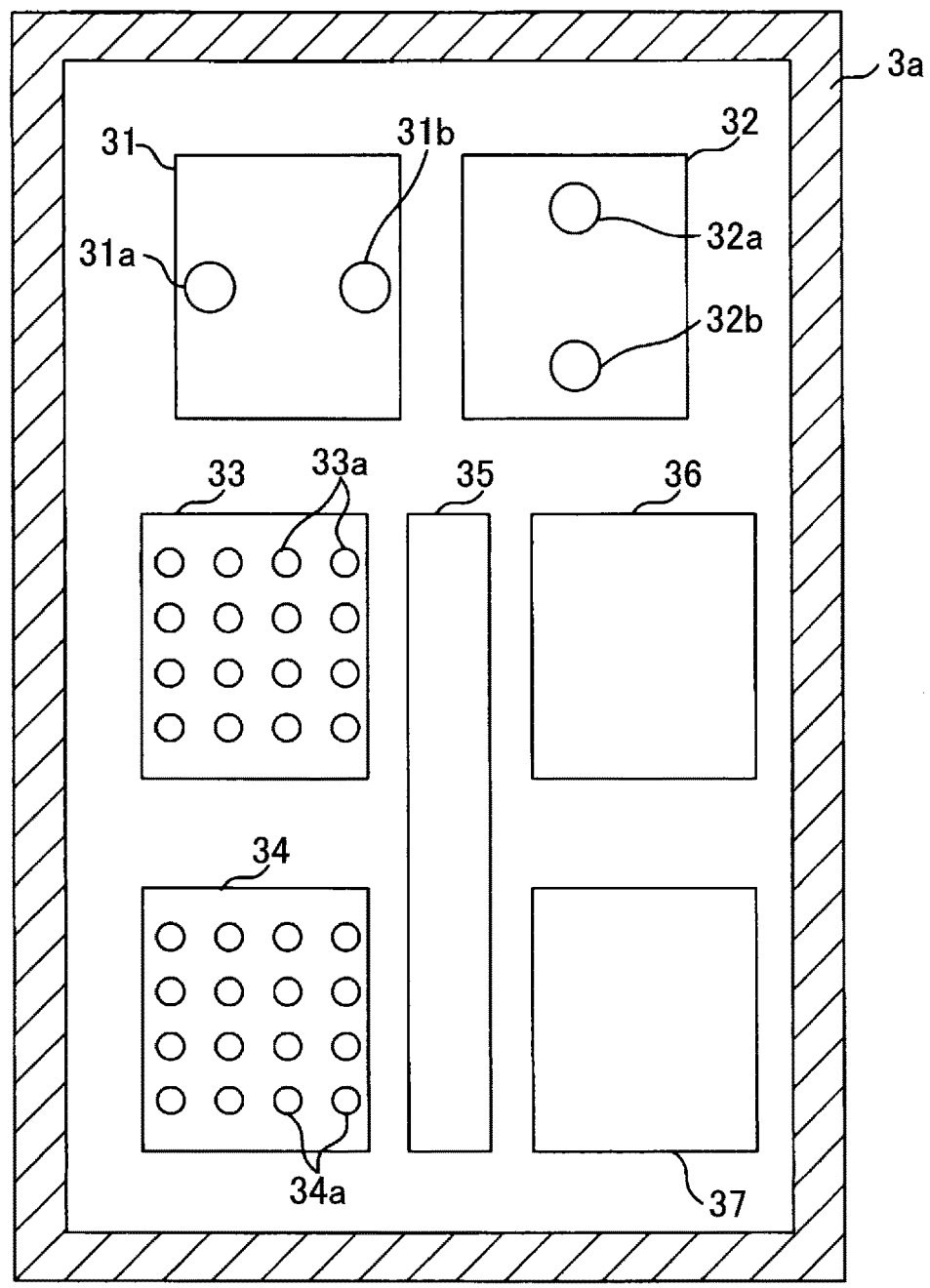
FIG. 16 is a schematic plan view for a horizontal cross section of a carriage.

Next, a printing device 1 according to a sixth embodiment of the present disclosure will be described while referring to the drawings. Components in structures according to the sixth embodiment that are identical to those in the first through fifth embodiments are designated with the same reference numerals to avoid duplicating description. FIG. 16 is a schematic plan view for a horizontal cross section of the carriage 3. In the sixth embodiment, the first distance sensor 31 and second distance sensor 32 are both disposed on the rear side of the carriage 3 and are aligned in the left-right direction. Thus, the measurement position by the first distance sensor 31 is substantially the same as the measurement position by the second distance sensor 32 in the front-rear direction. Accordingly, whether the first distance sensor 31 or the second distance sensor 32 is used, measurement results can be obtained for the approximate same front-rear position.

Seventh Embodiment

Figure 17:
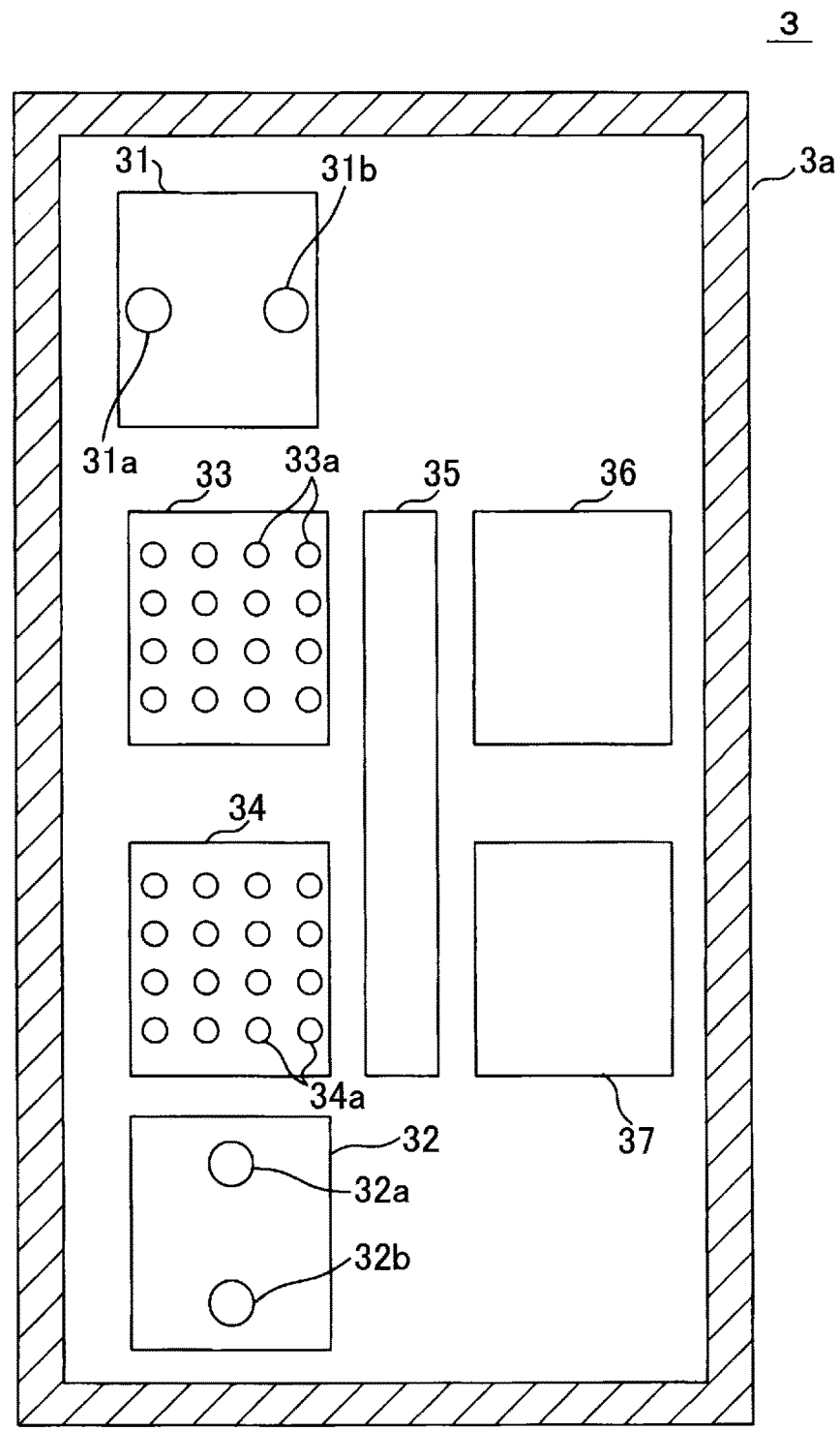
FIG. 17 is a schematic plan view for a horizontal cross section of a carriage.

Next, a printing device 1 according to a seventh embodiment of the present disclosure will be described while referring to the drawings. Components in structures according to the seventh embodiment that are identical to those in the first through sixth embodiments are designated with the same reference numerals to avoid duplicating description. FIG. 17 is a schematic plan view for a horizontal cross section of the carriage 3. In the seventh embodiment, the first distance sensor 31 is disposed in the rear section of the carriage 3, while the second distance sensor 32 is disposed in the front section of the carriage 3. The recording heads 33 and 34 are arranged between the first distance sensor 31 and second distance sensor 32 in the front-rear direction. By separating the first distance sensor 31 and second distance sensor 32 from each other in the front-rear direction, light from one of the sensors can be prevented from interfering with the other sensor when both are used simultaneously. This separation of the first distance sensor 31 and second distance sensor 32 can be applied to the third and fourth embodiments, for example. Note that the first distance sensor 31 may conversely be disposed in the front section of the carriage 3 while the second distance sensor 32 is disposed in the rear section.

Eighth Embodiment

Figure 18:
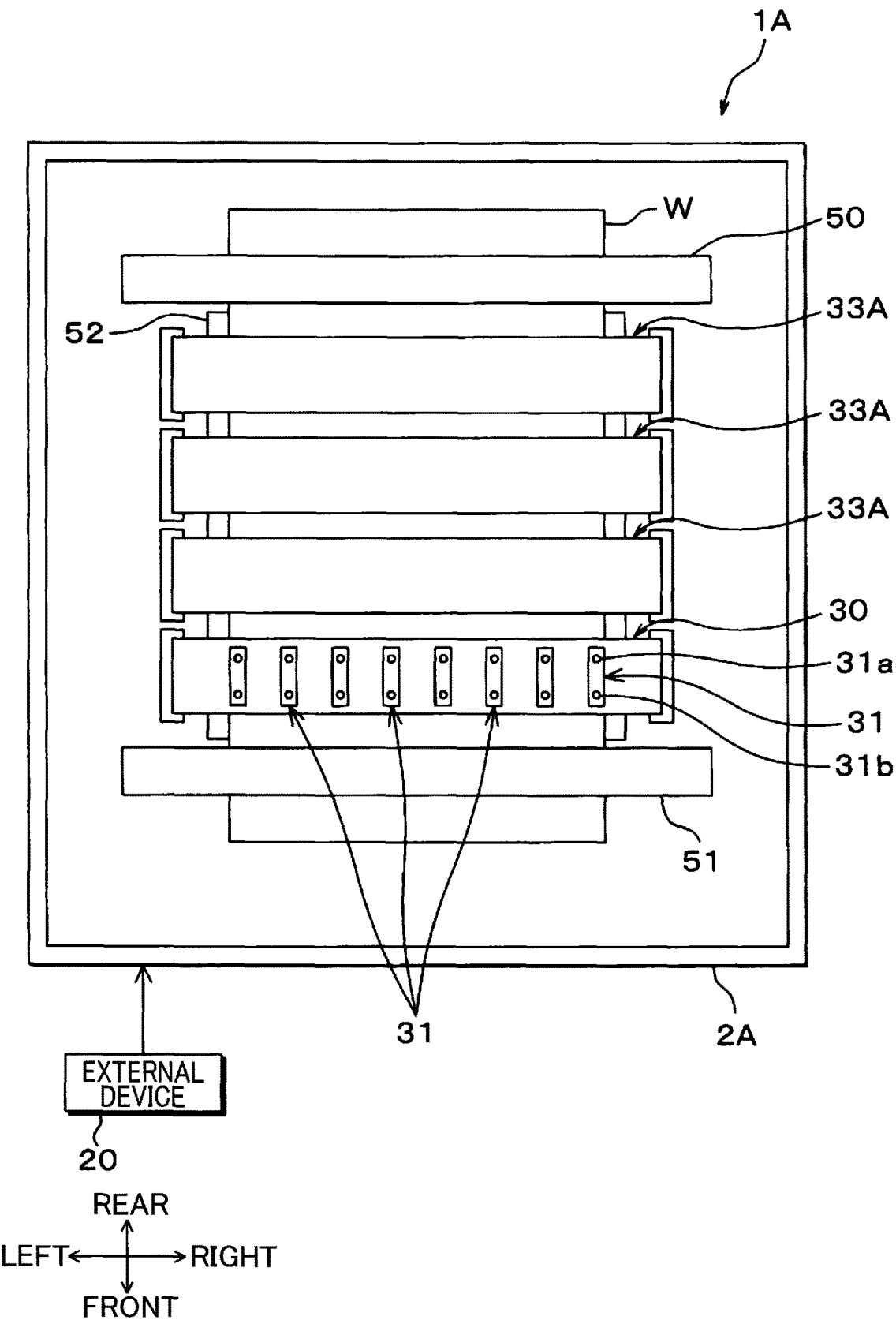
FIG. 18 is a plan view showing a printing device.

Next, a printing device 1A according to an eighth embodiment of the present disclosure will be described with reference to the drawings. Components in structures according to the eighth embodiment that are identical to those in the first through seventh embodiments are designated with the same reference numerals to avoid duplicating description. FIG. 18 is a plan view showing the printing device 1A. The printing device 1A is a line head type printing device. The printing device 1A is provided with a casing 2A.

Disposed in the casing 2A are a platen 52, three head bars 33A, conveying rollers 50 and 51, a controller (not shown), and the like. The printing medium W is supported on the platen 52. The conveying rollers 50 and 51 are respectively disposed at opposite ends of the platen 52 in the front-rear direction. When the conveying rollers 50 and 51 are rotated, a printing medium W is conveyed along the front-rear direction (the conveying direction).

Each head bar 33A has a rectangular external shape in a plan view and includes a plurality of inkjet heads. Each inkjet head has a plurality of nozzles. The rectangular head bars 33A are arranged such that their short sides are along the conveying direction for the printing medium W (the front-rear direction) and their long sides are along with a direction orthogonal to the conveying direction (the left-right direction). The head bars 33A are disposed such that the nozzle surfaces of the inkjet heads of the head bars 33A face the platen 52. The head bars 33A are juxtaposed in the front-rear direction between the conveying rollers 50 and 51. Each head bar 33A is fixed to the casing 2A.

A sensor bar 30 is disposed further forward than the head bars 33A. The sensor bar 30 is provided with a plurality of first distance sensors 31. The first distance sensors 31 are juxtaposed along the left-right direction. The light-emitting element 31a and light-receiving element 31b of each first distance sensor 31 are aligned in the front-rear direction, i.e., the conveying direction.

The controller of the printing device 1A actuates a motor (not shown) to control operations of the conveying rollers 50 and 51 and controls the first distance sensors 31 to measure distances between the first distance sensors 31 and the printing medium W. After measurements are complete, the controller controls the conveying rollers 50 and 51 to convey the printing medium W while controlling each of the head bars 33A to eject ink onto the printing medium W being conveyed.

While the sensor bar 30 of the eighth embodiment is provided with a plurality of first distance sensors 31, the sensor bar 30 instead may be provided with a single first distance sensor 31. Further, the sensor bar 30 may be provided with one or a plurality of second distance sensors 32, in addition to or in place of one or more first distance sensors 31.

All embodiments disclosed herein are illustrative in all aspects and should not be considered to be limiting. The technical features described in each embodiment may be combined with each other, and it would be apparent to those skilled in the art that various modifications may be made to the embodiments.

What is claimed is:

1. A printing device comprising:
a head having a nozzle and configured to eject liquid from the nozzle toward a printing medium; and
a carriage configured to move the head in a first direction, the carriage including a first distance sensor configured to measure a distance between the head and the printing medium, the first distance sensor being a specular reflection type distance sensor,
wherein the first distance sensor includes a light-emitting element and a light-receiving element that are aligned in the first direction,
wherein the carriage further includes a mist collector,
wherein the mist collector is positioned between the nozzle and the first distance sensor in the first direction, and
wherein the mist collector has a suction fan.

2. The printing device according to claim 1,
wherein the carriage further includes a second distance sensor configured to measure the distance between the head and the printing medium, the second distance sensor being a diffuse reflection type distance sensor, and
wherein the second distance sensor includes a light-emitting element and a light-receiving element that are aligned in a second direction crossing the first direction.

3. The printing device according to claim 2, further comprising:
a controller configured to perform:
determining whether an output value of the second distance sensor is within an allowable range; and
in response to determining that the output value of the second distance sensor is not within the allowable range, stopping the second distance sensor and emitting light from the first distance sensor.

4. The printing device according to claim 2, further comprising:
a controller configured to perform:
determining whether an output waveform of the second distance sensor is abnormal;
in response to determining that the output waveform of the second distance sensor is abnormal, determining whether a measurement portion by the second distance sensor is a leading portion of the printing medium;
in response to determining that the measurement portion by the second distance sensor is the leading portion of the printing medium, stopping the second distance sensor and emitting light from the first distance sensor; and
in response to determining that the measurement portion by the second distance sensor is not the leading portion of the printing medium, measuring the distance using both the first distance sensor and the second distance sensor.

5. The printing device according to claim 4,
wherein, in the measuring, the controller measures the distance between the head and a specific region of the printing medium using the first distance sensor, the specific region being a region in which the output waveform of the second distance sensor is abnormal.

6. The printing device according to claim 5, further comprising:
a memory,
wherein the controller is configured to further perform:
storing an output value of the first distance sensor and an output value of the second distance sensor in the memory; and deleting the output value of the second distance sensor for the specific region from the memory while keeping the output value of the first distance sensor for the specific region in the memory.

7. The printing device according to claim 2, further comprising:
a controller configured to perform:
determining whether an output waveform of the second distance sensor is abnormal; and
in response to determining that the output waveform of the second distance sensor is abnormal, measuring the distance using both the first distance sensor and the second distance sensor.

8. The printing device according to claim 7,
wherein, in the measuring, the controller measures the distance between the head and a specific region of the printing medium using the first distance sensor, the specific region being a region in which the output waveform of the second distance sensor is abnormal.

9. The printing device according to claim 8, further comprising:
a memory,
wherein the controller is configured to further perform:
storing an output value of the first distance sensor and an output value of the second distance sensor in the memory; and
deleting the output value of the second distance sensor for the specific region from the memory while keeping the output value of the first distance sensor for the specific region in the memory.

10. A printing device comprising:
a head having a nozzle and configured to eject liquid from the nozzle toward a printing medium;
a carriage configured to move the head in a first direction, the carriage including:
a first distance sensor configured to measure a distance between the head and the printing medium, the first distance sensor being a specular reflection type distance sensor, the first distance sensor including a light-emitting element and a light-receiving element that are aligned in the first direction; and
a second distance sensor configured to measure the distance between the head and the printing medium, the second distance sensor being a diffuse reflection type distance sensor, the second distance sensor including a light-emitting element and a light-receiving element that are aligned in a second direction crossing the first direction; and
a controller configured to perform:
determining whether an output waveform of the second distance sensor is abnormal; and
in response to determining that the output waveform of the second distance sensor is abnormal, stopping the second distance sensor and emitting light from the first distance sensor.

11. A printing device comprising:
a head having a nozzle and configured to eject liquid from the nozzle toward a printing medium;
a carriage configured to move the head in a first direction, the carriage including:
a first distance sensor configured to measure a distance between the head and the printing medium, the first distance sensor being a specular reflection type distance sensor, the first distance sensor including a light-emitting element and a light-receiving element that are aligned in the first direction; and
a second distance sensor configured to measure the distance between the head and the printing medium, the second distance sensor being a diffuse reflection type distance sensor, the second distance sensor including a light-emitting element and a light-receiving element that are aligned in a second direction crossing the first direction; and
a controller configured to perform:
determining whether an output value of the second distance sensor is within an allowable range;
in response to determining that the output value of the second distance sensor is not within the allowable range, determining whether a measurement portion by the second distance sensor is a leading portion of the printing medium;
in response to determining that the measurement portion by the second distance sensor is the leading portion of the printing medium, stopping the second distance sensor and emitting light from the first distance sensor; and
in response to determining that the measurement portion by the second distance sensor is not the leading portion of the printing medium, measuring the distance using both the first distance sensor and the second distance sensor.

12. The printing device according to claim 11,
wherein the controller is configured to further perform:
in response to determining that the output value of the second distance sensor is not within the allowable range, stopping the second distance sensor and emitting light from the first distance sensor.

13. A printing device comprising:
a head having a nozzle and configured to eject liquid from the nozzle toward a printing medium;
a carriage configured to move the head in a first direction, the carriage including:
a first distance sensor configured to measure a distance between the head and the printing medium, the first distance sensor being a specular reflection type distance sensor, the first distance sensor including a light-emitting element and a light-receiving element that are aligned in the first direction; and
a second distance sensor configured to measure the distance between the head and the printing medium, the second distance sensor being a diffuse reflection type distance sensor, the second distance sensor including a light-emitting element and a light-receiving element that are aligned in a second direction crossing the first direction;
a conveyor configured to convey the printing medium; and
a controller configured to perform:
starting measuring the distance using the first distance sensor or the second distance sensor at a time when conveyance of the printing medium starts; and
stopping the measuring at a time when the conveyance ends.

14. The printing device according to claim 13,
wherein the controller is configured to further perform:
conveying, while ejecting liquid from the nozzle toward the printing medium, the printing medium in a third direction using the conveyor; and
conveying, without ejecting liquid from the nozzle, the printing medium in a fourth direction different from the third direction using the conveyor, and
wherein the first distance sensor is positioned downstream of the second distance sensor in the fourth direction.

15. The printing device according to claim 14,
wherein the head is positioned between the first distance sensor and the second distance sensor.

16. The printing device according to claim 13,
wherein the controller performs the measuring while conveying the printing medium in a fifth direction using the conveyor, and
wherein the first distance sensor and the second distance sensor are positioned upstream of the head or downstream of the head in the fifth direction.

17. A printing device comprising:
a head having a nozzle and configured to eject liquid from the nozzle toward a printing medium;
a carriage configured to move the head in a first direction, the carriage including:
  a first distance sensor configured to measure a distance between the head and the printing medium, the first distance sensor being a specular reflection type distance sensor, the first distance sensor including a light-emitting element and a light-receiving element that are aligned in the first direction; and
  a second distance sensor configured to measure the distance between the head and the printing medium, the second distance sensor being a diffuse reflection type distance sensor, the second distance sensor including a light-emitting element and a light-receiving element that are aligned in a second direction crossing the first direction; and
a controller configured to perform:
  determining whether an output value of the second distance sensor is within an allowable range; and
  in response to determining that the output value of the second distance sensor is not within the allowable range, measuring the distance using both the first distance sensor and the second distance sensor.

18. The printing device according to claim 17,
wherein the controller is configured to further perform:
  in response to determining that the output value of the second distance sensor is not within the allowable range, stopping the second distance sensor and emitting light from the first distance sensor.

* * * * *